(12) United States Patent
Stanley et al.

(10) Patent No.: US 10,470,375 B2
(45) Date of Patent: Nov. 12, 2019

(54) LAND PREPARATION TOOLS

(71) Applicant: Fecon, LLC, Lebanon, OH (US)

(72) Inventors: Jeffrey Stanley, Lebanon, OH (US); Robert Hentz, Hamilton, OH (US)

(73) Assignee: Fecon, LLC, Lebanon, OH (US)

( * ) Notice: Subject to any disclaimer, the term of this patent is extended or adjusted under 35 U.S.C. 154(b) by 0 days.

(21) Appl. No.: 16/372,228

(22) Filed: Apr. 1, 2019

(65) Prior Publication Data

US 2019/0223385 A1 Jul. 25, 2019

Related U.S. Application Data

(60) Continuation of application No. 16/268,648, filed on Feb. 6, 2019, which is a continuation of application No. 15/920,227, filed on Mar. 13, 2018, now Pat. No. 10,201,130, which is a continuation of application No. 15/172,655, filed on Jun. 3, 2016, now Pat. No. 9,943,037, which is a continuation of application No. 29/560,329, filed on Apr. 5, 2016, now Pat. No. Des. 791,195, which is a division of application No.
(Continued)

(51) Int. Cl.
*A01G 3/00* (2006.01)
*A01B 33/14* (2006.01)
*A01G 23/093* (2006.01)
*B02C 18/18* (2006.01)

(52) U.S. Cl.
CPC ............ *A01G 3/002* (2013.01); *A01B 33/142* (2013.01); *A01G 23/093* (2013.01); *B02C 18/18* (2013.01)

(58) Field of Classification Search
CPC ...... A01G 3/002; A01G 23/03; A01G 23/093; A01G 23/00; A01G 23/067; A01G 23/091; B02C 18/18; B02C 18/145; B02C 13/06; B02C 18/184; B02C 13/09; B02C 18/146; B02C 13/28; B02C 13/282; A01B 33/142; A01B 33/103; A01B 33/021; A01B 33/10; A01B 35/28
See application file for complete search history.

(56) References Cited

U.S. PATENT DOCUMENTS

| 833,797 A | 10/1906 | Ollrich |
| 1,905,384 A | 4/1933 | Jass |

(Continued)

FOREIGN PATENT DOCUMENTS

| FR | 2866909 A1 | 9/2005 |
| WO | 2009105752 A2 | 8/2009 |

OTHER PUBLICATIONS

International Search Report and Written Opinion received for International Application No. PCT/US2009/034872, dated Apr. 21, 2009, 8 pages.

(Continued)

*Primary Examiner* — Arpad Fabian-Kovacs
(74) *Attorney, Agent, or Firm* — Ulmer & Berne LLP

(57) ABSTRACT

A land preparation tool includes a tool body having a cutting surface, a mounting surface, an opening, and a channel. The cutting surface has a blade positioned at a distal end thereof. The mounting surface has a non-planar profile and is disposed on the tool body opposite the cutting surface. The opening is disposed on the mounting surface and the channel extends from the opening at least partially into the tool body. Other embodiments are described and claimed.

20 Claims, 14 Drawing Sheets

Related U.S. Application Data

29/466,991, filed on Sep. 13, 2013, now Pat. No. Des. 757,124, which is a continuation of application No. 12/918,677, filed as application No. PCT/US2009/034872 on Feb. 23, 2009, now Pat. No. 8,540,033.

(60) Provisional application No. 61/030,744, filed on Feb. 22, 2008.

(56) References Cited

U.S. PATENT DOCUMENTS

| | | |
|---|---|---|
| 2,131,947 A | 10/1938 | Gilmore |
| 2,242,808 A | 5/1941 | Austin |
| 2,560,413 A | 7/1951 | Carlson |
| 3,049,824 A | 8/1962 | McIninch |
| 3,203,488 A | 8/1965 | Eastwood, III |
| 3,274,908 A | 9/1966 | Grant et al. |
| 3,277,802 A | 10/1966 | Petersen |
| 3,358,569 A | 12/1967 | Averette |
| 3,490,117 A | 1/1970 | Hertel |
| 3,642,214 A | 2/1972 | Blackwell, Jr. |
| 3,774,324 A | 11/1973 | LaFond |
| 3,837,408 A | 9/1974 | Green |
| 3,850,375 A | 11/1974 | Ford |
| 4,231,406 A | 11/1980 | Jonsson |
| 4,329,091 A | 5/1982 | Erkfritz |
| 4,667,713 A | 5/1987 | Wright |
| 4,668,122 A | 5/1987 | Riddle |
| 4,682,916 A | 7/1987 | Briese |
| 4,709,737 A | 12/1987 | Jonsson |
| 4,727,664 A | 3/1988 | Hemphill |
| 4,782,774 A | 11/1988 | Clarke |
| 4,813,491 A | 3/1989 | Gross |
| 4,826,090 A | 5/1989 | Orphall |
| 4,842,337 A | 6/1989 | Southern |
| 4,891,858 A | 1/1990 | Wachter |
| 4,918,843 A | 4/1990 | Kiesewetter et al. |
| 4,919,566 A | 4/1990 | Caron et al. |
| 4,932,447 A | 6/1990 | Morin |
| H000946 H | 8/1991 | Lonn |
| 5,077,918 A | 1/1992 | Garman |
| 5,211,212 A | 5/1993 | Carlson et al. |
| 5,259,692 A | 11/1993 | Beller et al. |
| 5,423,138 A | 6/1995 | Livesay et al. |
| 5,484,110 A | 1/1996 | Doppstadt |
| 5,503,339 A | 4/1996 | Doppstadt |
| 5,644,965 A | 7/1997 | McLennan et al. |
| 5,873,534 A | 2/1999 | Shinn |
| 5,875,980 A | 3/1999 | Schmid |
| 6,024,143 A | 2/2000 | Ritchey |
| 6,045,072 A | 4/2000 | Zehr |
| 6,047,749 A | 4/2000 | Lamb |
| D424,076 S | 5/2000 | Dibbern et al. |
| 6,059,373 A | 5/2000 | Wright et al. |
| 6,089,480 A | 7/2000 | Rawlings |
| D435,571 S | 12/2000 | Dibbern et al. |
| 6,176,445 B1 | 1/2001 | Shinn |
| 6,193,430 B1 | 2/2001 | Culpepper et al. |
| 6,247,757 B1 | 6/2001 | Cochran |
| D446,224 S | 8/2001 | Clendenning |
| D447,154 S | 8/2001 | Clendenning |
| 6,394,378 B1 | 5/2002 | Ragnarsson |
| 6,422,495 B1 | 7/2002 | De Boef et al. |
| 6,435,434 B1 | 8/2002 | Monyak |
| 6,502,609 B1 | 1/2003 | Guels |
| 6,517,274 B1 | 2/2003 | Watanabe et al. |
| 6,536,322 B1 | 3/2003 | Butler et al. |
| 6,682,262 B2 | 1/2004 | Caron et al. |
| D486,503 S | 2/2004 | East |
| 6,708,431 B2 | 3/2004 | Robinson et al. |
| 6,712,551 B2 | 3/2004 | Livesay et al. |
| D488,174 S | 4/2004 | East |
| 6,725,758 B2 | 4/2004 | MacLennan et al. |
| 6,764,035 B2 | 7/2004 | Denis et al. |
| 6,810,783 B1 | 11/2004 | Larose |
| 6,837,453 B2 | 1/2005 | Sturm |
| 7,108,452 B2 | 9/2006 | Caron et al. |
| 7,150,215 B2 | 12/2006 | Krehel |
| 7,222,808 B2 | 5/2007 | Edwards |
| 7,278,462 B2 | 10/2007 | Purdy et al. |
| 7,281,676 B1 | 10/2007 | Bennington |
| D567,832 S | 4/2008 | Edwards |
| 7,380,576 B2 | 6/2008 | Pizzuto |
| 7,448,567 B2 | 11/2008 | Roozeboom et al. |
| 7,578,462 B2 | 8/2009 | Edwards |
| 7,584,921 B1 | 9/2009 | Bennington et al. |
| 7,634,897 B2 | 12/2009 | MacLennan et al. |
| 7,713,006 B2 | 5/2010 | MacLennan et al. |
| 7,810,531 B2 | 10/2010 | Labbé |
| 7,828,026 B2 | 11/2010 | MacLennan et al. |
| 7,913,432 B2 | 3/2011 | MacLennan et al. |
| 7,938,350 B2 | 5/2011 | Doppstadt et al. |
| 7,967,044 B2 | 6/2011 | Labbe et al. |
| 7,980,278 B2 | 7/2011 | Labbe et al. |
| D647,928 S | 11/2011 | MacLennan et al. |
| 8,167,225 B2 | 5/2012 | Gaudreault |
| 8,167,226 B2 | 5/2012 | Engnell |
| 8,540,033 B2 | 9/2013 | Stanley et al. |
| 8,550,391 B2 | 10/2013 | Denis et al. |
| 8,550,392 B2 | 10/2013 | Nakagawa |
| 8,807,868 B2 | 8/2014 | Schlenker et al. |
| 8,807,869 B1 | 8/2014 | Lee |
| 8,893,997 B2 | 11/2014 | Gaudreault |
| 8,893,998 B2 | 11/2014 | Midorikawa et al. |
| D757,124 S | 5/2016 | Stanley et al. |
| D772,951 S | 11/2016 | Stanley et al. |
| D791,195 S | 7/2017 | Stanley et al. |
| D795,929 S | 8/2017 | Stanley et al. |
| D795,931 S | 8/2017 | Stanley et al. |
| 9,943,037 B2 | 4/2018 | Stanley et al. |
| D821,455 S | 6/2018 | Stanley et al. |
| 10,201,130 B2 | 2/2019 | Stanley et al. |
| 2002/0017580 A1 | 2/2002 | Ragnarsson |
| 2002/0190148 A1 | 12/2002 | Roozeboom et al. |
| 2003/0188619 A1* | 10/2003 | MacLennan ............ B23D 61/04 83/839 |
| 2003/0192299 A1 | 10/2003 | Kaga et al. |
| 2004/0016153 A1 | 1/2004 | Pippins |
| 2004/0216580 A1* | 11/2004 | Taillon ................ B23D 61/026 83/835 |
| 2004/0238067 A1* | 12/2004 | Ries ..................... A01G 23/091 144/4.1 |
| 2005/0001084 A1 | 1/2005 | Pizzuto |
| 2005/0098331 A1 | 5/2005 | Edwards |
| 2006/0272183 A1 | 12/2006 | Kergen |
| 2007/0151430 A1* | 7/2007 | MacLennan ............ B23C 5/207 83/13 |
| 2007/0193428 A1 | 8/2007 | MacLennan et al. |
| 2007/0194161 A1 | 8/2007 | Doppstadt et al. |
| 2007/0261762 A1 | 11/2007 | Eriksson |
| 2008/0283257 A1 | 11/2008 | Edwards |
| 2009/0014189 A1 | 1/2009 | Stanley et al. |
| 2010/0180735 A1 | 7/2010 | MacLennan et al. |
| 2011/0100658 A1 | 5/2011 | Stanley et al. |
| 2012/0032013 A1 | 2/2012 | Rice et al. |
| 2013/0099039 A1 | 4/2013 | Gaudreault |
| 2013/0277476 A1 | 10/2013 | Doppstadt et al. |
| 2015/0173310 A1 | 6/2015 | Willibald |
| 2016/0278298 A1 | 9/2016 | Stanley et al. |
| 2017/0079219 A1 | 3/2017 | Stanley et al. |
| 2017/0087558 A1 | 3/2017 | Davis |
| 2018/0199517 A1 | 7/2018 | Stanley et al. |

OTHER PUBLICATIONS

International Preliminary Report on Patentability received for International Application No. PCT/US2009/034872, dated Aug. 24, 2010, 7 pages.

* cited by examiner

LAND PREPARATION TOOLS

CROSS REFERENCE

This application is a continuation of U.S. application Ser. No. 16/268,648, filed Feb. 6, 2019, which is a continuation of U.S. application Ser. No. 15/920,227, filed Mar. 13, 2018, now U.S. Pat. No. 10,201,130, which is a continuation of U.S. application Ser. No. 15/172,655, filed Jun. 3, 2016, now U.S. Pat. No. 9,943,037, which is a continuation of U.S. application Ser. No. 29/560,329, filed Apr. 5, 2016, now U.S. Pat. No. D791,195, which is a divisional of U.S. application Ser. No. 29/466,991, filed Sep. 13, 2013, now U.S. Pat. No. D757,124, which is a continuation of U.S. application Ser. No. 12/918,677, filed Nov. 30, 2010, now U.S. Pat. No. 8,540,033, which is a PCT National Phase Entry of PCT/US2009/034872, filed Feb. 23, 2009, which claims the benefit of U.S. Provisional Application Ser. No. 61/030,744, filed Feb. 22, 2008, all of which are herein incorporated by reference.

BACKGROUND

The present invention relates to attachment systems and methods for land preparation tools, such as cutting, grinding, mulching, and/or shredding tools, more particularly tool interfaces for attachments to powered vehicles.

Land preparation and clearing machines and apparatus such as forestry machines and apparatus are utilized for clearing land, creating paths, and otherwise removing debris, brush, trees, vegetation, soil, concrete, asphalt, rock, and/or other materials, making the land suitable for further development or use. To carry out these tasks, such machines can be fitted with land preparation attachments or apparatus operable to mulch, cut, shred, and/or grind vegetation, brush, trees, stumps, soil, concrete, asphalt, rock, and other materials.

In particular, the apparatus may be integrally or detachably attached to a tractor, skid steer, or other vehicle to facilitate articulation and movement of the mowing apparatus with respect to the vegetation. Often, the vehicle is a multi-purpose vehicle having the capability to be fitted with any of a variety of attachments suitable for the task at hand. For example, the vehicle can include a common connection for connecting to and driving the apparatus such as brush cutters, rotary mowers, shredders, grinders, and crushers. Such land preparation and clearing apparatus can be hydraulically driven via hydraulic power from the vehicle. One illustrative type of land preparation and clearing apparatus is known as a "flail mower" which utilizes a rotatable axle with either swinging or fixed position cutting tools (often known as "flails").

SUMMARY

According to one embodiment, an exemplary land preparation apparatus comprising a rotatable drum and a plurality of tool assemblies disposed on the rotatable drum is provided. Each tool assembly comprises a tool holder comprising a mounting surface defining a non-planar profile, and a land preparation tool connected to the tool holder and comprising a mounting surface in flush contact with the tool holder mounting surface. The mounting surface of the land preparation tool defines a non-planar profile which is the inverse of the non-planar profile of the tool holder mounting surface.

According to another embodiment, another exemplary land preparation apparatus comprising a rotatable drum and a plurality of tool assemblies disposed on the rotatable drum is provided. Each tool assembly comprises a tool holder comprising a mounting surface defining a non-planar profile, a land preparation tool comprising a mounting surface, and an intermediate connector disposed between and connecting the tool holder and the land preparation tool. The intermediate connector comprises a tool holder interface in flush contact with the mounting surface of the tool holder. The tool holder interface defines a non-planar profile inverse to the non-planar profile of the tool holder mounting surface.

According to further embodiments, the non-planar profile is convex, concave, V-shaped, or combinations thereof.

In even further embodiments, the above described land preparation tool further comprises a cutting surface disposed on a surface opposite the mounting surface of the land preparation tool, wherein the cutting surface defines an upper region and a lower region. The lower region defines a non-planar profile extending outwardly from a plane defined by the upper region. The land preparation tool also comprises a pair of side surfaces extending between the mounting surface and the cutting surface, wherein each side surface comprises an upper region and a lower region. The lower region of the cutting surface extends widthwise a horizontal distance beyond the width of the tool holder mounting surface, and wherein the lower region of the side surfaces extend widthwise a horizontal distance beyond the width of the tool holder mounting surface.

These and additional objects and advantages provided by the embodiments of the present invention will be more fully understood in view of the following detailed description, in conjunction with the drawings.

BRIEF DESCRIPTION OF THE DRAWINGS

The following detailed description of embodiments of the present invention can be best understood when read in conjunction with the drawings enclosed herewith.

Figure 1:
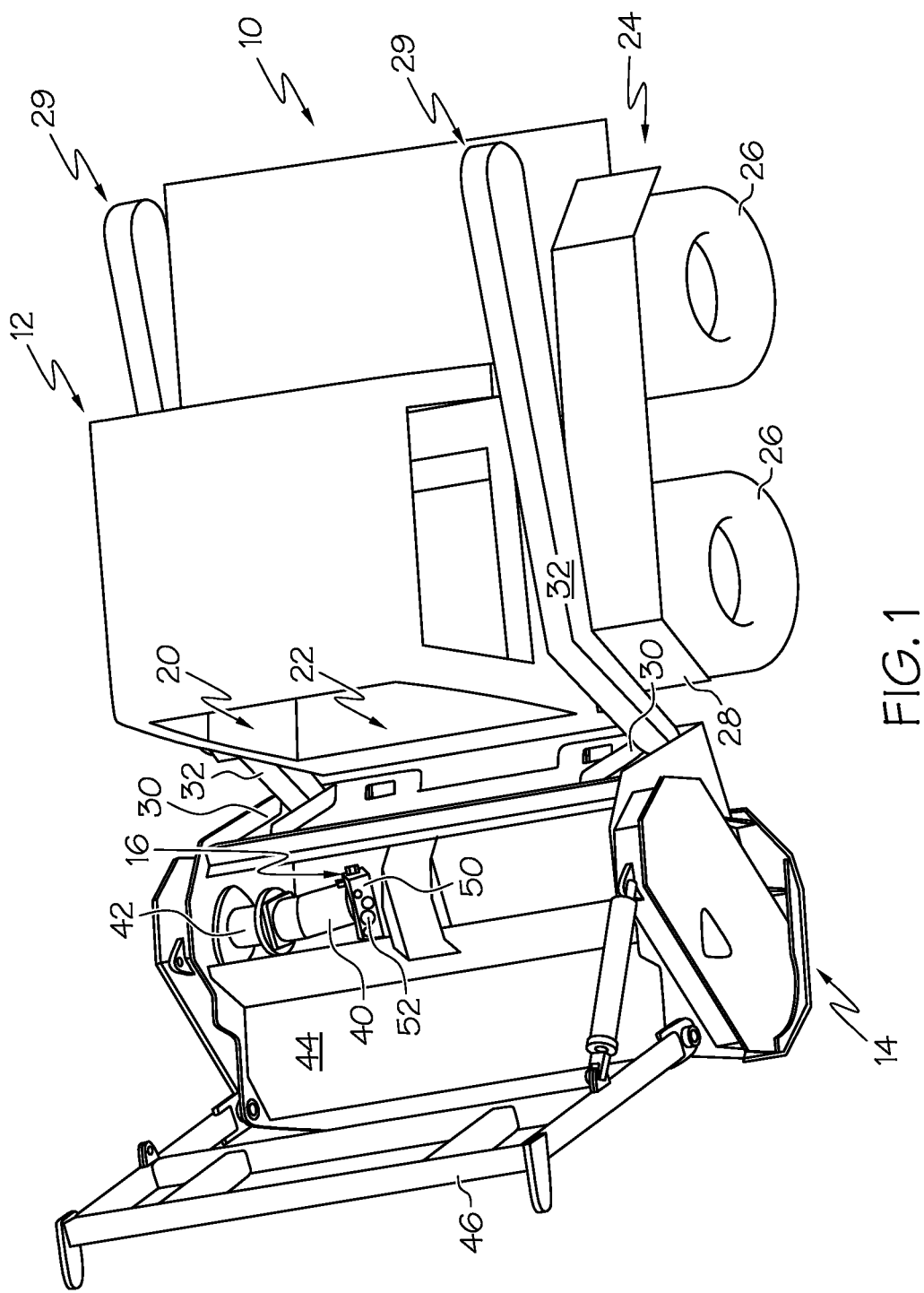
FIG. 1 is a top isometric view of an exemplary land preparation and clearing machine according to one or more embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

The present invention is generally directed to land preparation and clearing machines ("Land Preparation Machine") that are designed to cut, grind, mulch, shred, clear, mill, and/or mix trees, brush, ground cover, vegetation, debris, asphalt, concrete, and/or soil. The Land Preparation Machines and their corresponding implements may comprise a variety of vehicles and implements, including but not limited to skid steer vehicles, forestry machines and vehicles, PTO tractors, farm tractors and/or any other known vehicles and their corresponding implements compatible with land preparation and clearing. Such Land Preparation Machines may prepare the surface and subsurface of the earth. As used herein, the phrases "land preparation and clearing" and "land preparation" will mean any land preparation and clearing operations, including but not limited to forestry operations such as cutting, grinding, mulching, shredding, clearing, milling, and/or mixing trees, brush, ground cover, vegetation, debris, soil, rock, asphalt, concrete, and/or soil. As used herein, "feed material" describes trees, brush, ground cover, vegetation, debris, soil, rock, asphalt, concrete, and/or soil produced from such land preparation and clearing operations, including but not limited to forestry operations such as clearing land, cutting and/or mulching trees, and/or preparing land surfaces (e.g., creating paths).

Figure 2:
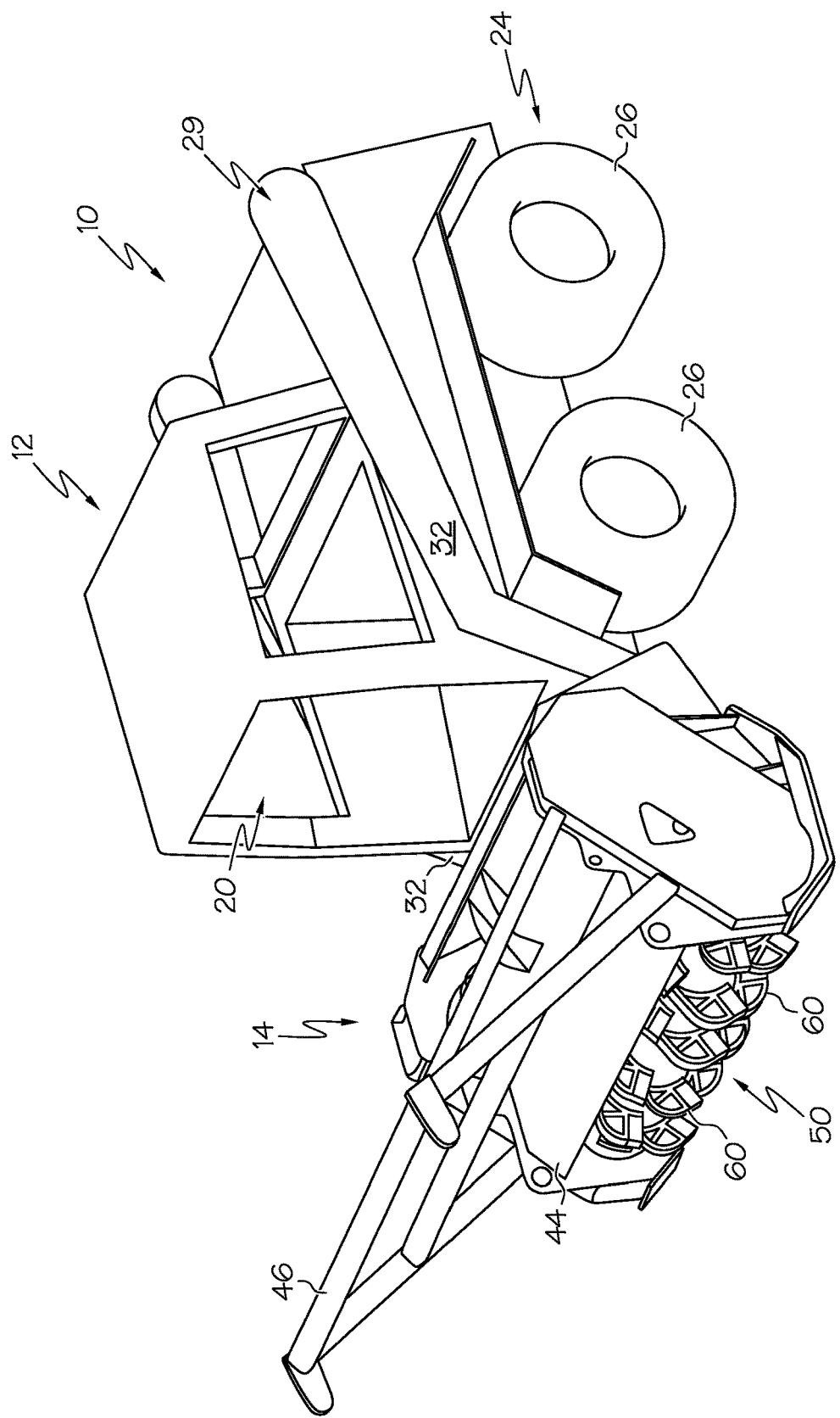
FIG. 2 is a isometric view of the exemplary land preparation and clearing machine of FIG. 1.

Referring to FIGS. 1-2, an exemplary embodiment of a Land Preparation Machine 10 includes a vehicle 12 (e.g., a forestry vehicle) and a land preparation apparatus 14 connected to the vehicle 12. In this exemplary embodiment, the vehicle 12 is a skid steer vehicle suitable for off-road travel, and includes a driver station 20 as well as an all-terrain wheel assembly 24. The wheel assembly may include tires 26. In addition, tires 26 may drive all-terrain tracks (not shown), which may provide traction for the vehicle 12 to move over a variety of terrains and in a variety of conditions. The all-terrain tracks may comprise metal or rubber-based tracks that wrap around tires 26 as known to one of ordinary skill in the art. The vehicle 12 also includes a hydraulically operated vertical lift assembly 29 for vertically lifting the land preparation apparatus 14, and any other attachments that may be used with the vehicle. Controls 22 can be provided for control of the hydraulic lift assembly 29, including the lift arms 32 as well as for controlling the power provided to the wheel assembly 24 and for controlling the operation of the land preparation apparatus 14.

While the land preparation apparatus 14 is shown in this example connected to and powered by vehicle 12 which is a skid steer vehicle, other suitable all-terrain vehicles with capability for powering and utilizing a hydraulic motor attachment or tool (e.g., such as land preparation apparatus 14) could be provided, such as other forestry vehicles, mini-track loaders, excavators, backhoes, PTO tractors, farm tractors, and/or any other known vehicles and their corresponding implements compatible with land preparation and clearing. Further examples of suitable skid steer vehicles are shown and described in U.S. Pat. Nos. 4,168,757 and 4,209,071, the entire disclosures of which are hereby incorporated by reference herein.

In the exemplary embodiment shown in FIGS. 1 and 2, the land preparation apparatus 14 is removably connectable to the vehicle 12. The connection between the attachment 14 and the vehicle 12 can be accomplished in any of a variety of manners, such as by providing receptacles 30 for receiving vertical lift arms 32 from the vehicle 12. The land preparation apparatus 14, in this example, further includes a hydraulic supply connection for receiving an operating supply of hydraulic fluid from a pump within the vehicle to power the land preparation apparatus 14, and a hydraulic return connection for returning hydraulic fluid to a tank within the vehicle 12. The hydraulic supply and return connections may comprise convention quick-disconnect connections as known to one of ordinary skill in the art.

It is understood that land preparation apparatus 14 may also be fixedly attached to the vehicle 12 and/or be a stand-alone machine such as a walk behind land preparation apparatus. Also, it is understood that other hydraulically-operated rotary mowing or cutting attachments may be utilized with principles of the present invention, integral with or detachable from vehicle 12, and/or separately from or in combination with the land preparation apparatus 14. Other configurations are also possible, such as where the fluid pump and tank are located at other locations. Connection, powering, and movement of the land preparation apparatus 14 can be accomplished with various configurations, such as those described in U.S. Pat. Nos. 4,148,366, and 5,813,792, for example, which are hereby incorporated herein by reference.

Figure 3A:
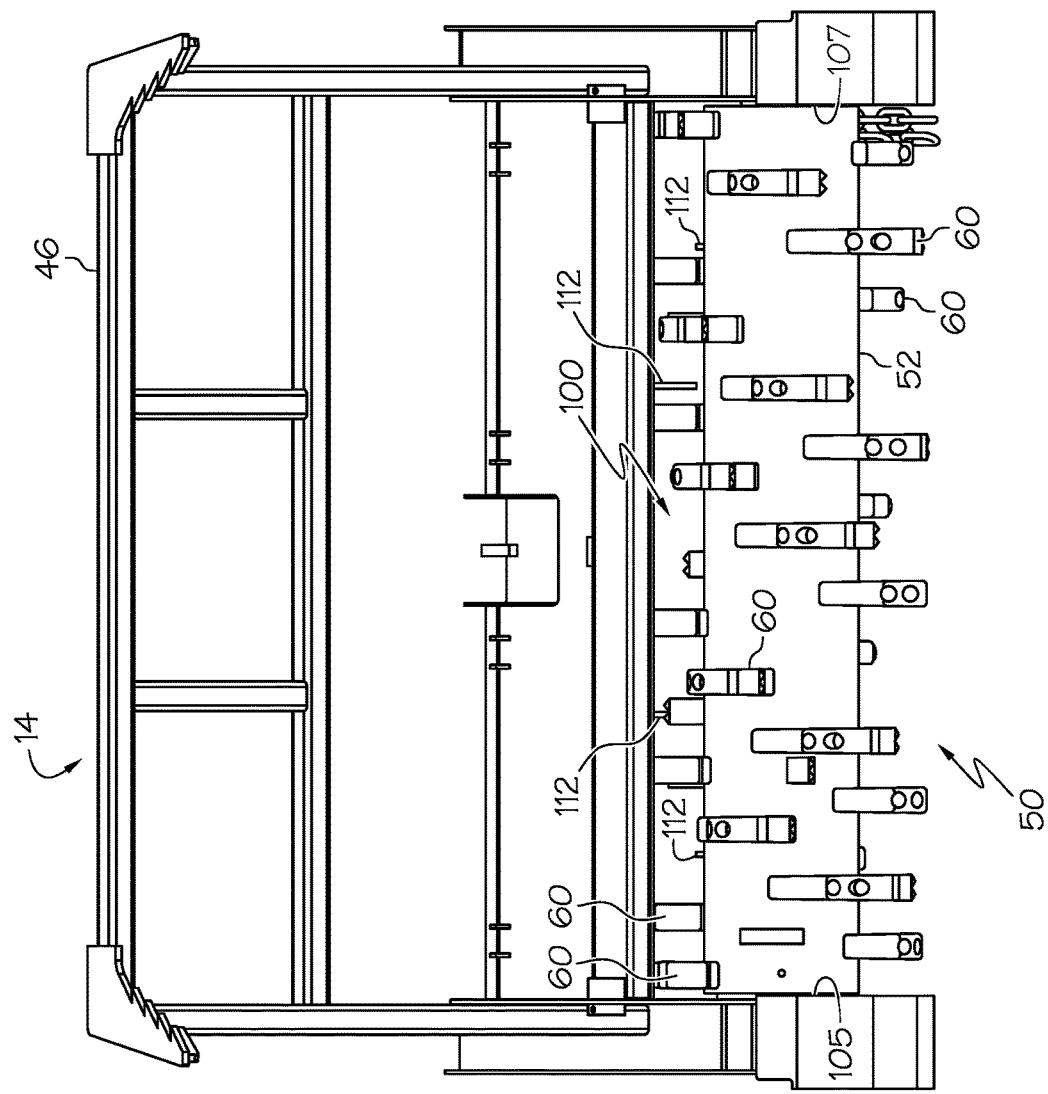
FIG. 3A is a front elevational view of an exemplary land preparation apparatus according to one or more embodiments of the present invention.

Referring to FIGS. 1-3A, the land preparation apparatus 14 may include a housing 44 forming a chamber 100, right and left end plates 105 and 107, respectively, connected to the housing 44, and a movable tool (e.g., rotatable tool 50) movably (e.g., rotatably) connected to and between the right and left end plates 105 and 107 within the chamber 100. Right and left end plates 105 and 107 may alternatively be integral with the housing 44. In this exemplary embodiment, the rotatable tool 50 comprises a rotatable drum or rod 52 and a plurality of tool assemblies 60 spaced along and extending radially from the tool drum 52 as shown in FIGS. 2 and 3A. For additional details regarding the arrangement of tool assemblies 60 on the rotatable drum, U.S. application Ser. No. 12/172,691 has been incorporated by reference herein in its entirety. FIGS. 4A-14B shows multiple exemplary embodiments of tool assemblies 60 in accordance with one or more embodiments of the present invention.

Optionally, rotatable tool 50 may also comprise an axle 56 extending longitudinally from either one or both ends of the tool drum 52. For movement of the rotatable tool 50, a hydraulic motor 40, such as a hydraulic piston motor, provides rotation of a rotor (e.g., drive shaft 42) which drives the rotatable tool drum 52, which thereby causes rapid rotation of the tool assemblies 60, such as at speeds of between about 100 to about 3000 rpm. The drive shaft 42 may drive a belt (not shown), which engages and drives the axle 56 to turn tool drum 52. Alternatively, the drive shaft 42 may be directly connected to the drum 52 or axle 56.

In one particular embodiment, the hydraulic lift arms 32 raise and lower the land preparation apparatus 14 via controls 22 to allow the tool assembly 60 (e.g., the teeth or cutters of the tool assembly 60) to come into contact with brush, trees, vegetation, or other objects to be cut or shredded or cleared. Controls 22 may also control the supply of fluid to the hydraulic motor 40 to start and stop the rotation of the tool drum 52 and tool assemblies 60. The land preparation attachment 14 may include any number of suitable components, cutters, grinders, mixers, and/or tools for providing a cutting, grinding, mulching, shredding, clearing, milling, and/or mixing function. In addition, the land preparation apparatus may comprise safety mechanisms such as a guard assembly 46 as shown in FIGS. 1-3A.

In yet another exemplary embodiment, the hydraulic motor 40 is controlled by a hydraulic brake 16 which automatically slows the motor 40 when the flow of hydraulic fluid to the motor via the hydraulic supply line is discontinued. For additional detail on land preparation machinery (e.g., forestry machinery) or hydraulic components associated with land preparation machinery (e.g., forestry machinery), U.S. Publication No. 2006/0032222 has been incorporated by reference in its entirety herein.

Referring to the embodiments of FIGS. 3B-11B, each tool assembly 60 comprises a tool holder 62 and a land preparation tool 66. As will be described herein in view of the figures, the term "land preparation tool" includes, but is not limited to a cutter, blade, grinder, chipper, knife, hammer tool, milling tool, flailing tool or element, carbide tip, steel tip, composite tip, any other tool for suitable for land surface preparation and clearing as described and defined above herein, or any combination thereof. The tool assemblies 60, and any of its components, may be fabricated from a variety of metals, composites, plastics, or combinations thereof. Additional detail regarding tool assemblies is provided in U.S. Pat. Nos. 4,223,441 and 4,222,418, which are hereby incorporated by reference herein. Further as will be described herein in view of the figures, the term "tool holder" is a support structure for the land preparation tool. The land preparation tool 66 may be directly connected to the tool holder 62 as shown in FIGS. 4A-8A or may be connected to the tool holder 62 via an intermediate connector 76 as will be described in detail below and shown in FIGS. 9A-11B. As used herein, "connected" may mean fixedly connected (for example, by welding together the tool holder 62, the land preparation tool 66, and optionally the intermediate connector 76) or removably connected (for example, by bolting, matingly coupling, adhering, or magnetically coupling the tool holder 62, the land preparation tool 66, and optionally the intermediate connector 76). If removable, the land preparation tool 66 may comprise a replaceable tip that is designed to be replaced once worn due to use, permitting the tool holder 62 to remain affixed to the tool drum 52 while the tool 66 is replaced.

Figure 4A:
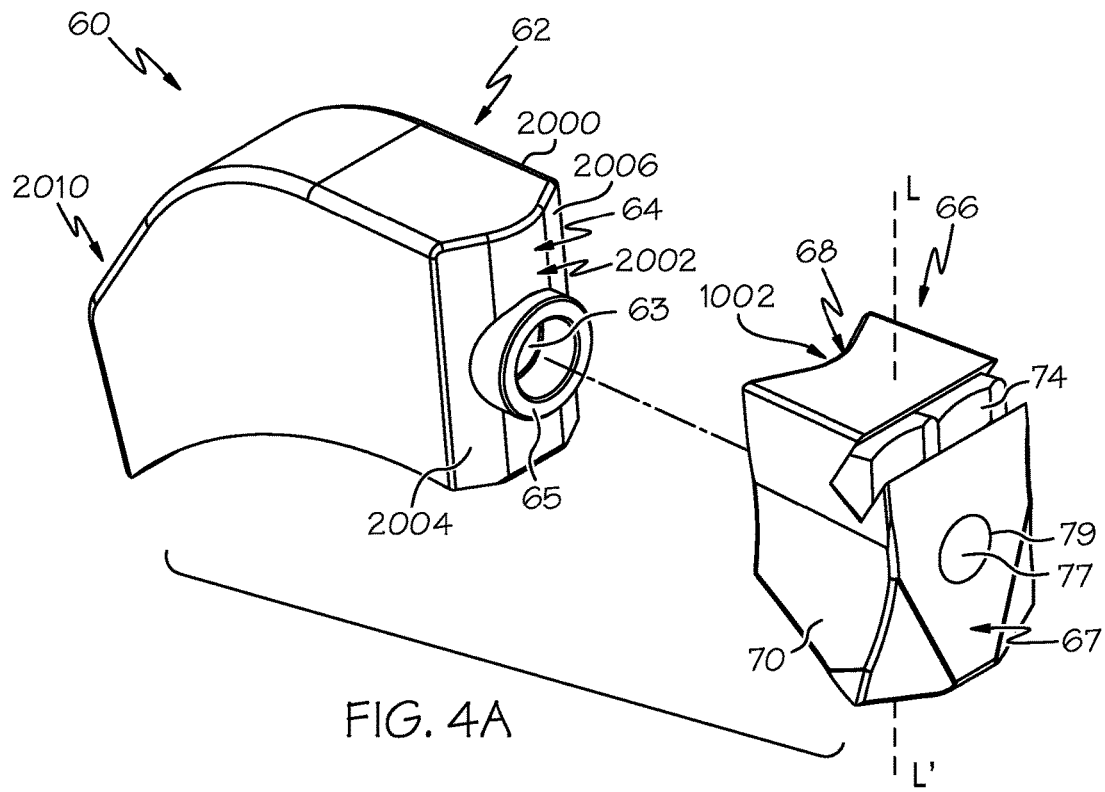
FIG. 4A is an exploded isometric view of an exemplary tool assembly comprising a tool holder, and a land preparation tool according to one or more embodiments of the present invention.
Figure 4B:
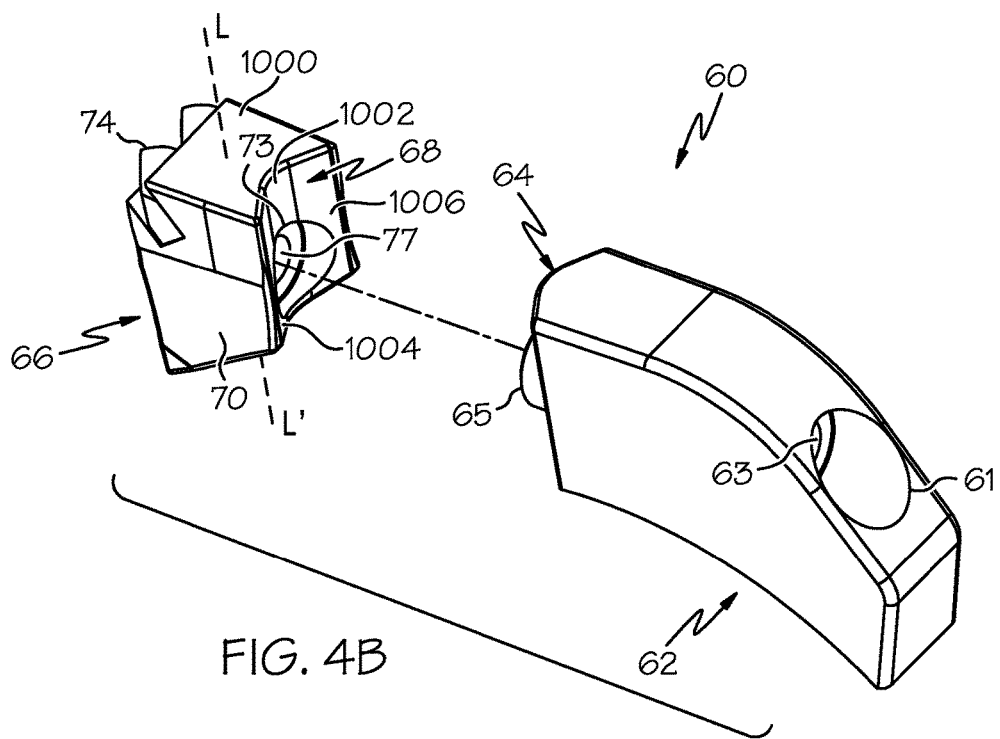
FIG. 4B is a rotated isometric view of the exemplary land preparation tool of FIG. 4A which shows the mounting surface of the exemplary land preparation tool according to one or more embodiments of the present invention.
Figure 5A:
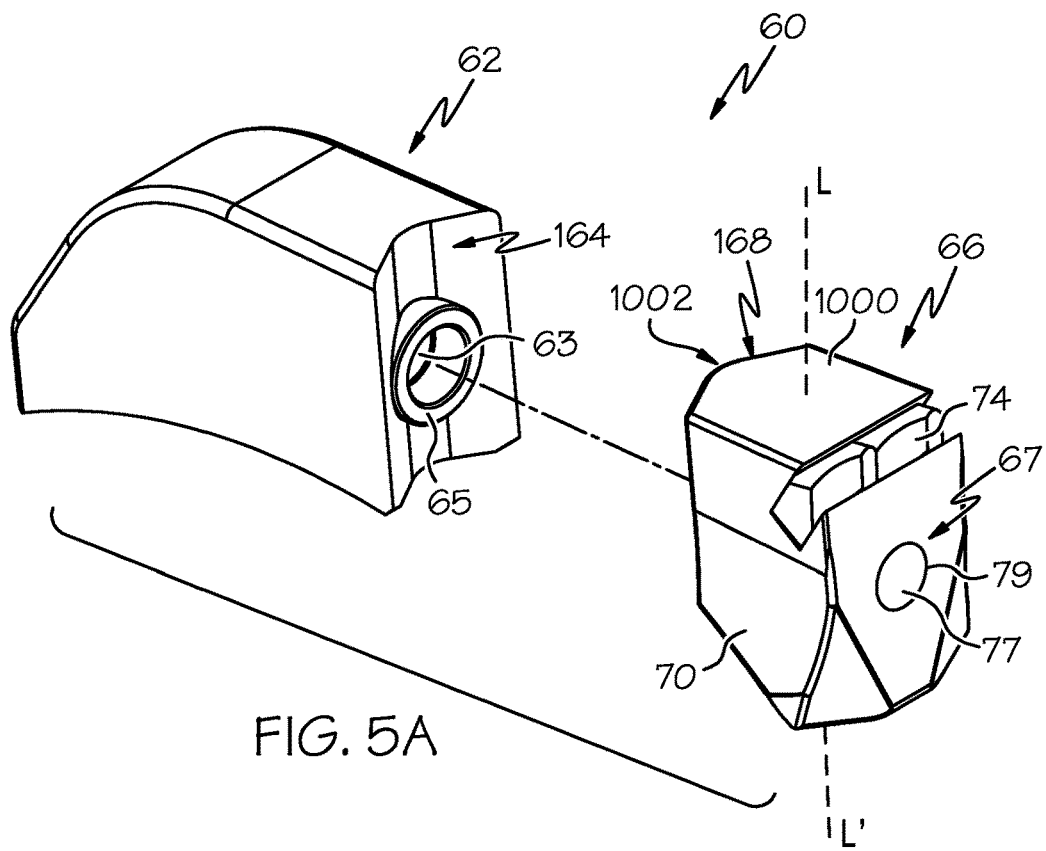
FIG. 5A is an exploded isometric view of another exemplary tool assembly comprising a tool holder, and a land preparation tool according to one or more embodiments of the present invention.

Referring to the embodiment of FIGS. 4A and 4B, the tool holder 62 comprises a tool holder body 2000, a mounting surface 64 defining a non-planar profile having an apex 2002, and an end portion 2010 of the tool holder body, opposite the mounting surface 64. As used herein, non-planar profile defines any surface, which is not a straight planar surface, for example, V-shaped, concave, convex, or combinations thereof. As shown in the embodiment of FIGS. 4A and 4B, the non-planar profile of the tool holder mounting surface 64 may define a convex V-shape. The mounting surface 64 includes a first mounting surface 2004 adjacent the apex 2002 and a second mounting surface 2006 adjacent the apex, opposite the first mounting surface. The first and second mounting surfaces 2004, 2006, both extend outwardly from the apex 2002 and taper backwards toward the end portion 2010 of the tool holder body 2000. For example, as shown in FIGS. 4A and 4B, the first mounting surface 2004 and second mounting surface 2006 meet to define a joined surface region (e.g., apex 2002). Referring to an alternative embodiment as shown in FIG. 5A, the non-planar profile of the tool holder mounting surface 164 may define a concave V-shape, wherein the mounting surface 164 tapers inwardly towards the middle of the tool holder mounting surface 164.

Figure 5B:
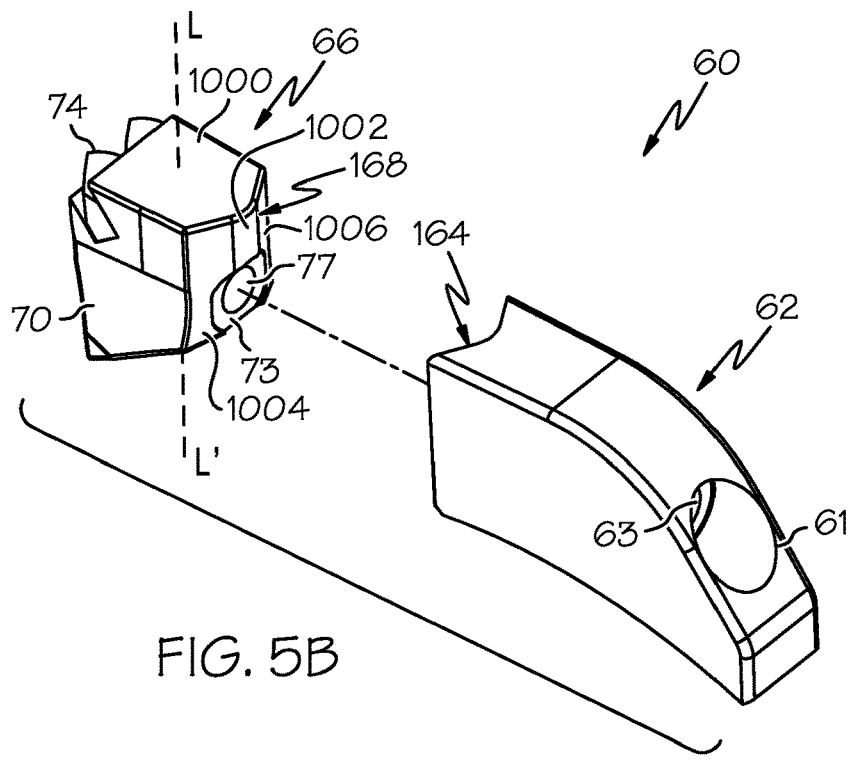
FIG. 5B is a rotated isometric view of the exemplary land preparation tool of FIG. 5A which shows the mounting surface of the exemplary land preparation tool according to one or more embodiments of the present invention.

Referring to FIGS. 4A and 4B, a land preparation tool 66 may also comprise a tool body 1000 having a longitudinal axis L-L', a cutting surface 67, a mounting surface 68 on an opposite side of the tool body from the cutting surface, and at least one blade 74 disposed on the cutting surface 67. The mounting surface 68 defines a non-planar profile which is the inverse of the non-planar profile of the tool holder mounting surface 64. As shown in FIG. 4B, the mounting surface 68 of the land preparation tool 66 may define a concave V-shape having an apex 1002 that extends along about half of the mounting surface 68 parallel to the longitudinal axis L-L'. The concave V-shape is the inverse of the convex V-shape configuration of the tool holder mounting surface 64. The mounting surface 68 includes a first mounting surface 1004 adjacent the apex and a second mounting surface 1006 adjacent the apex, opposite the first mounting surface, that both extend outwardly from the apex 1002 away from the cutting surface 67. For example, as shown in FIGS. 4A and 4B, the first mounting surface 1004 and second mounting surface 1006 meet to define a joined surface region (e.g., apex 1002). In an alternative embodiment as shown in FIGS. 5A and 5B, the land preparation tool 66 includes a tool body 1000 having a longitudinal axis L-L', a cutting surface 67, a mounting surface 168 on an opposite side of the tool body from the cutting surface, and at least one blade 74 disposed on the cutting surface 67. The mounting surface 168 of the land preparation tool 66 defines a convex V-shape, which is the inverse of the concave V-shape configuration of the tool holder mounting surface 164, and includes an apex 1002, a first mounting surface 1004 adjacent the apex, and a second mounting surface 1006 adjacent the apex, opposite the first mounting surface. First and second mounting surfaces 1004, 1006 extend outwardly from the apex 1002 back toward from the cutting surface 67. For example, as shown in FIGS. 5A and 5B, the first mounting surface 1004 and second mounting surface 1006 meet to define a joined surface region (e.g., apex 1002). As a result of the inverse non-planar profiles of the mounting surfaces, flush contact may be achieved when the tool holder 62 and land preparation tool 66 are connected. This yields an interference fit or a friction fit between the inverse surfaces 64 and 68, which combats sliding (e.g., horizontal sliding) of the tool holder 62 or land preparation tool 66.

Figure 7A:
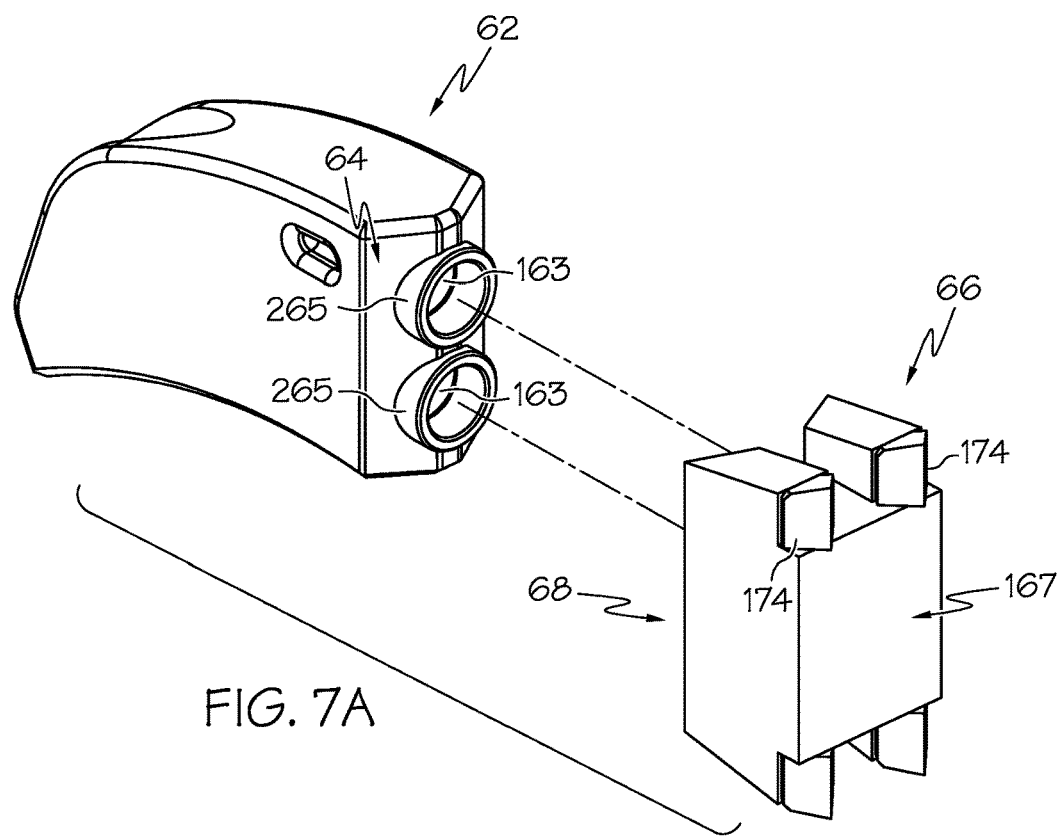
FIG. 7A is an exploded isometric view of yet another exemplary tool assembly comprising a tool holder, and a land preparation tool comprising pairs of upper and lower cutting blades according to one or more embodiments of the present invention.
Figure 7B:
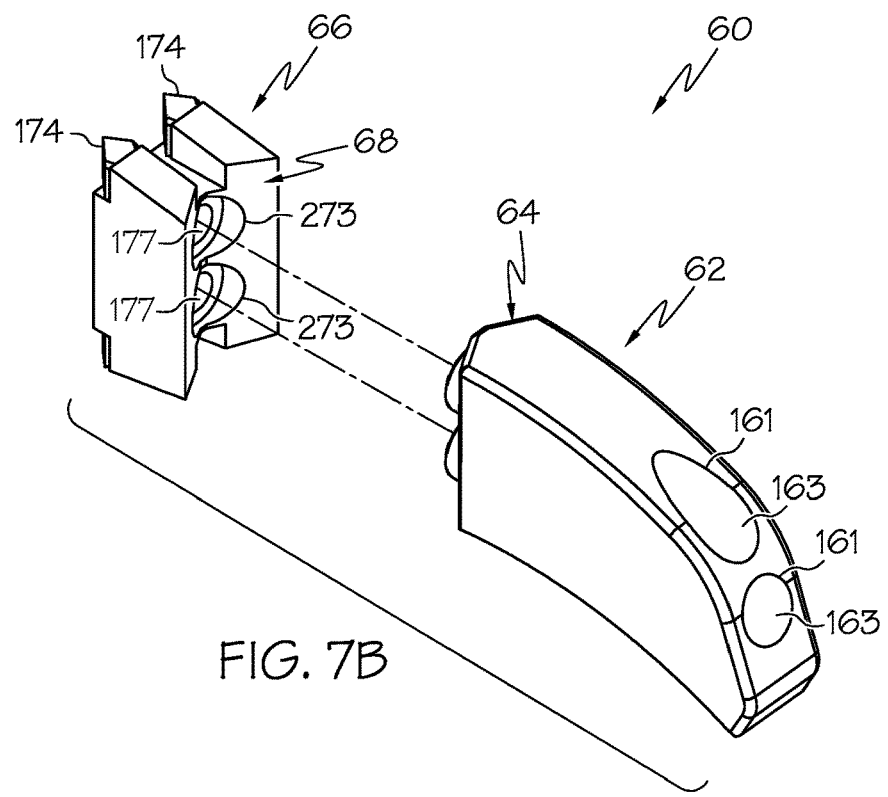
FIG. 7B is a rotated isometric view of the exemplary tool assembly of FIG. 7A according to one or more embodiments of the present invention.

In addition to the interference fit between inverse surfaces 64 and 68, other coupling arrangements are further contemplated. Referring again to FIGS. 4A and 4B, each tool holder 62 may comprise a coupling mechanism 65 disposed on the mounting surface 64 of the tool holder 62. As shown in the embodiment of FIGS. 4A and 4B, the coupling mechanism may comprise at least one rounded bushing or peg 65 extending from the mounting surface 64 of the tool holder 62. The rounded peg 65 of FIGS. 4A and 4B may be hollow with a channel 63 therein, wherein the channel 63 extends from the rounded peg 65 to an opening 61 disposed on the opposite end of the tool holder 62. While FIGS. 4A and 4B depict only one channel 63 extending through the tool holder 62, it is contemplated to have more than one channel. In the exemplary embodiment of FIGS. 7A and 7B, the tool holder 62 comprises a pair of rounded pegs 265 with a pair of rounded channels 163 disposed therein. As shown in FIGS. 7A and 7B, the one peg is disposed above the other peg; however, a side-by-side configuration of rounded pegs (not shown) is also contemplated herein.

Figure 6A:
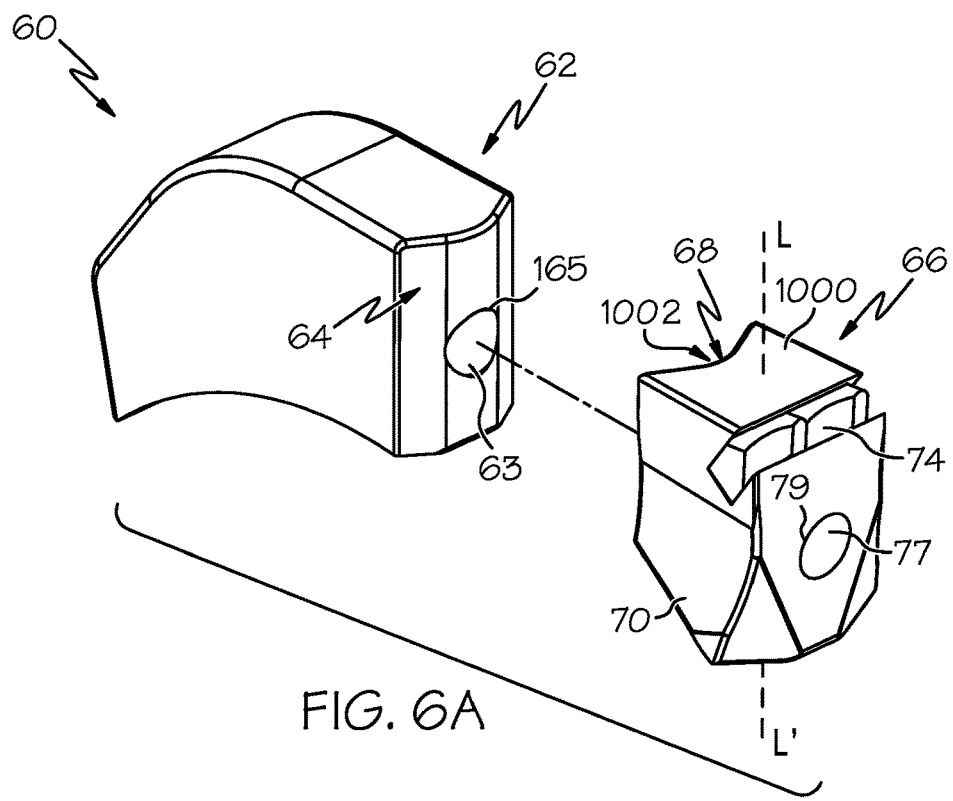
FIG. 6A is an exploded isometric view of yet another exemplary tool assembly comprising a tool holder, and a land preparation tool according to one or more embodiments of the present invention.
Figure 6B:
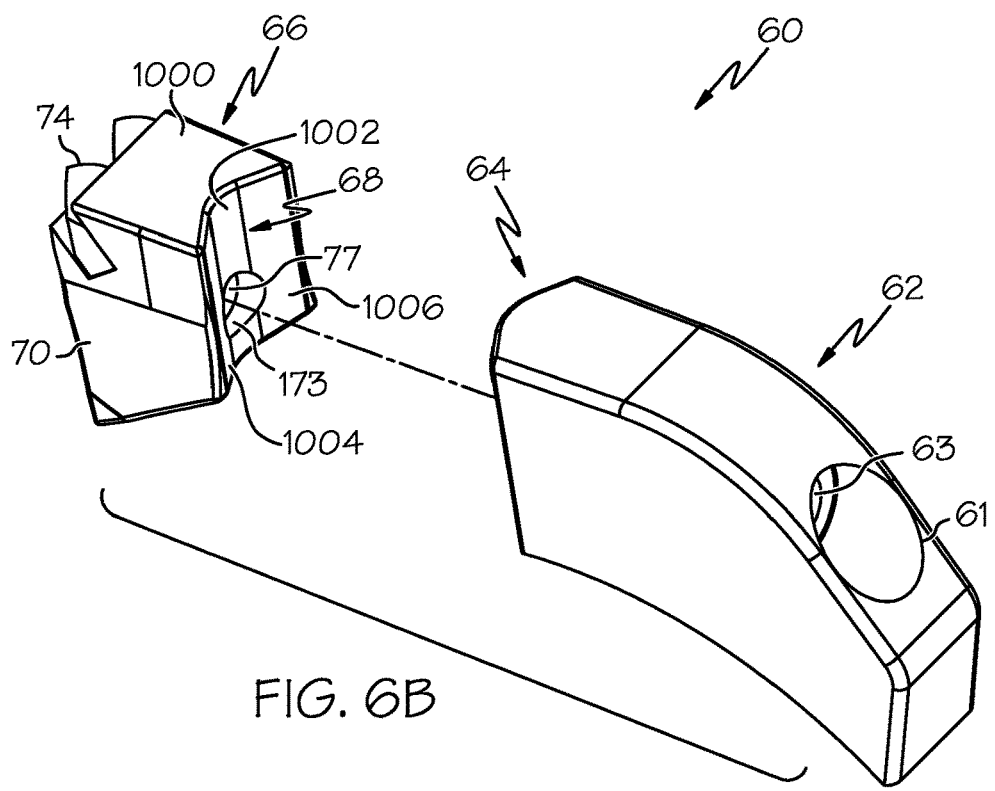
FIG. 6B is a rotated isometric view of the exemplary land preparation tool of FIG. 6A which shows the mounting surface of the exemplary land preparation tool according to one or more embodiments of the present invention.

In yet another embodiment as shown in FIGS. 6A-6B, the tool holder 62 may lack a rounded peg or comparable coupling mechanism on the mounting surface 64; however, the tool holder 62 may still include a channel 63 extending from opening 165 on the mounting surface 64 to opening 61 disposed on the opposite end of the tool holder 62. As shown in FIGS. 6A-6B, the land preparation tool 66 includes a tool body 1000 having a longitudinal axis L-L', a cutting surface 67, a mounting surface 68 on an opposite side of the tool body from the cutting surface, and at least one blade 74 disposed on the cutting surface 67. The mounting surface 68 includes an apex 1002, a first mounting surface 1004 adjacent the apex, and a second mounting surface 1006 adjacent the apex, opposite the first mounting surface. First and second mounting surfaces 1004, 1006 extend outwardly from the apex away from the cutting surface. For example, as shown in FIGS. 6A and 6B, the first mounting surface 1004 and second mounting surface 1006 meet to define a joined surface region (e.g., apex 1002). The FIGS. 9A and 9B embodiments also lack a coupling mechanism but include two channels 163 extending from openings 465 on the mounting surface 64 to openings 161 disposed on the opposite end of the tool holder 62. Moreover, the opposite mating arrangement to the exemplary embodiments of FIGS. 4A-5B, and 7A-7B is contemplated. For example, the tool holder 62 may comprise at least one round recess and the land preparation tool 66 may comprise at least one round peg which may be matingly inserted into the round recess of the tool holder 62. Although the present embodiments depict rounded pegs or rounded recesses, other shapes, for example square or rectangular pegs are also contemplated herein.

Additionally, although the figures generally depict channels 63 and 163 with circular tube shapes, other channel shapes and configurations are contemplated herein. Moreover, the channel 63 may be a threaded channel (not shown) disposed inside hollow pegs 65; however, it is contemplated to use non-hollow pegs without channels extending therethrough.

Figure 8A:
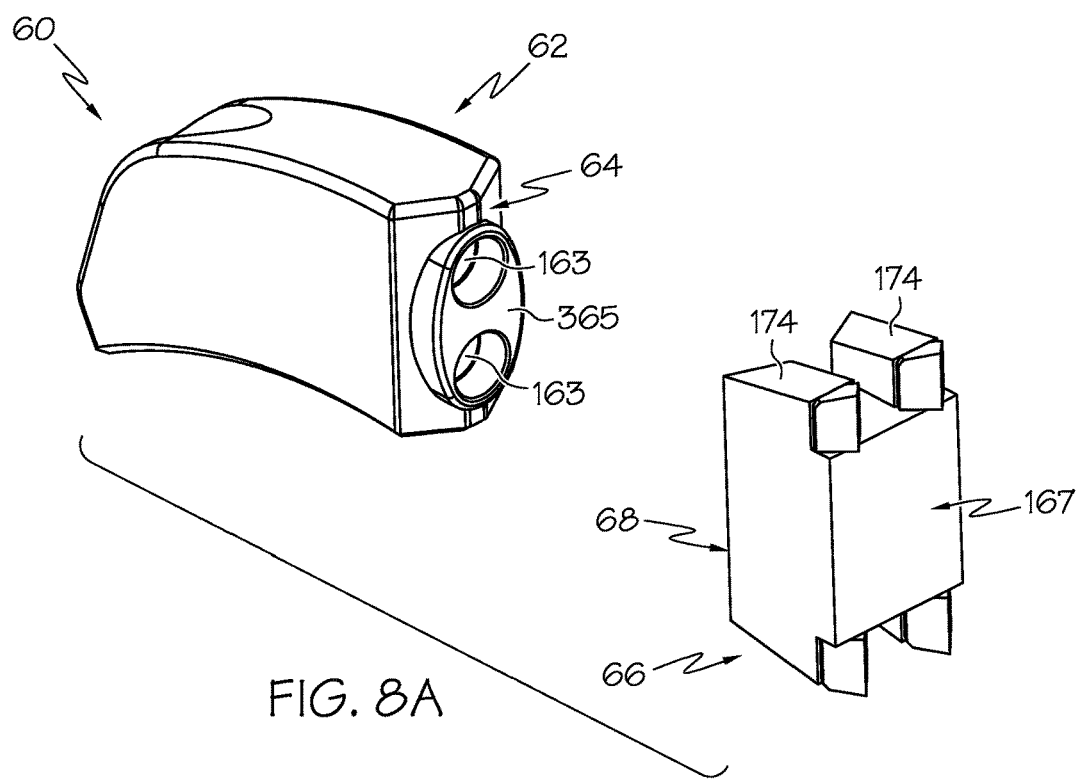
FIG. 8A is an exploded isometric view of another exemplary tool assembly according to one or more embodiments of the present invention.
Figure 8B:
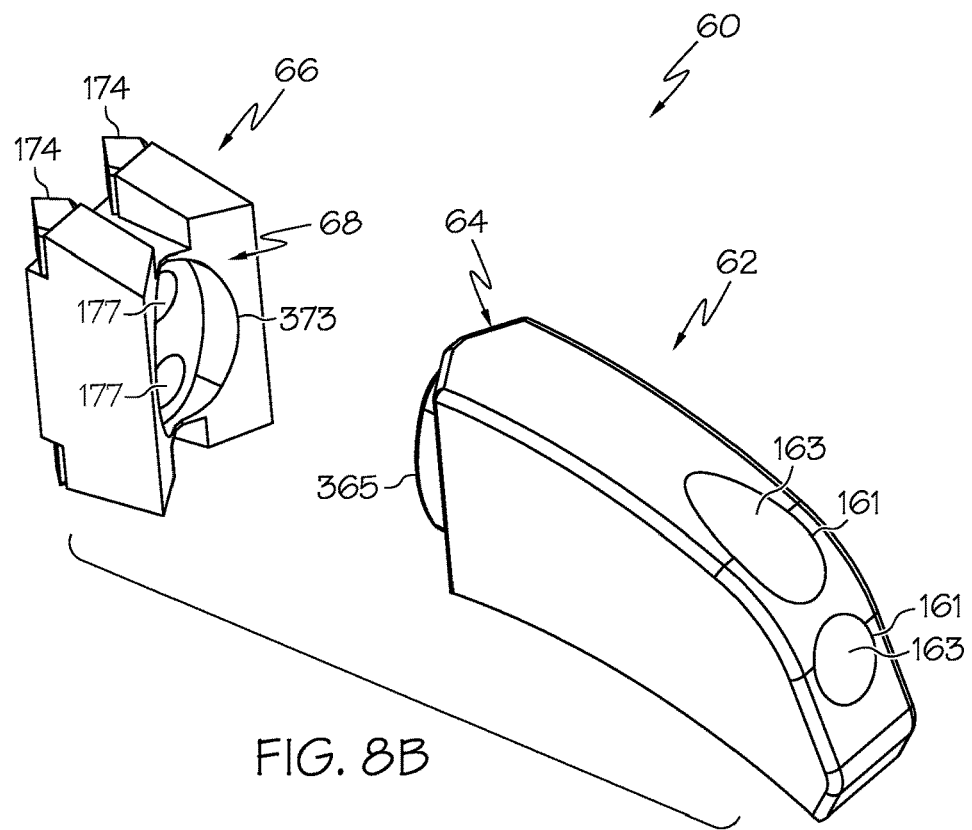
FIG. 8B is a rotated isometric view of the exemplary tool assembly of FIG. 8A according to one or more embodiments of the present invention.

To couple (e.g., matingly couple) with the coupling mechanism of the tool holder 62, the land preparation tool 66 may comprise a coupling mechanism on its mounting surface 68 as shown in FIGS. 4A and 4B. In the embodiment of FIGS. 4A and 4B, the coupling mechanism of the land preparation tool 66 may comprises at least one round recess 73, which may receive the round peg 65 of the tool holder 62, thereby facilitating the mating of the land preparation tool 66 and the tool holder 62. While mating is the depicted coupling arrangement in the figures, other coupling mechanisms for the tool holder 62 and land preparation tool 66 are contemplated herein, for example, welding, adhering, magnetically coupling, or combinations thereof. Further as shown in FIGS. 7A and 7B, the land preparation tool 66 may comprise a pair of rounded recesses 273, which are configured to receive the rounded pegs 265 of the tool holder 62. In yet another embodiment as shown in FIGS. 8A and 8B, the coupling mechanism of the tool holder 62 may also comprise a raising bushing 365 (for example, a raised oval shaped bushing) comprising a pair of orifices therein. For coupling, the land preparation tool 66 comprises a rounded recess 373 (e.g., oval shaped) to correspond to the shape of the raised busing 365 in order to receive the raised bushing 365 of the tool holder 62.

Moreover as shown in FIGS. 4A and 4B, the land preparation tool 66 may optionally comprise at least one channel 77 extending from the round recess 73 to an opening 79 disposed on the cutting surface 67 of the land preparation tool 66, which is disposed on a surface opposite the mounting surface 68 of the land preparation tool 66. When the tool holder 62 and land preparation tool 66 are coupled, the respective channels 63 and 77 of the tool holder 62 and land preparation tool 66 are aligned. Alternatively, the land preparation tool 66 may also comprise multiple channels such as the two channel 177 embodiment of FIGS. 7A and 7B. In a further embodiment, the channel 77 may be a threaded channel (not shown). The benefits of threaded channels in the tool holder 62 and land preparation tool 66 will be discussed in detail below.

Figure 11A:
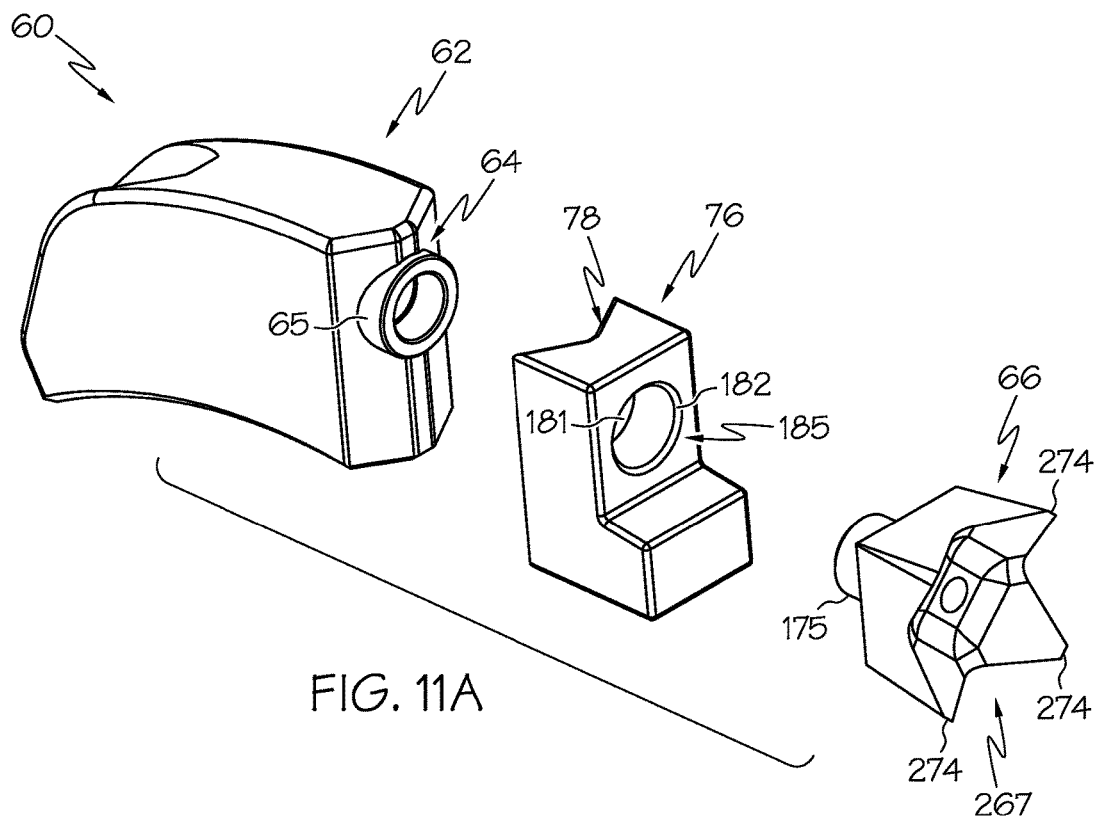
FIG. 11A is an exploded isometric view of an exemplary tool assembly comprising a tool holder, an intermediate connector, and a land preparation tool comprising a plurality of blades according to one or more embodiments of the present invention.

As shown in FIGS. 4A and 4B, the cutting surface 67 may comprise the at least one blade, or any other tooling component described above. For example, the cutting surface 67 may comprise twin side-by side blades 74 positioned at a distal end of the cutting surface, as shown in FIG. 4B. Alternatively as shown in FIGS. 7A and 7B, the cutting surface 167 may include two pairs of blades 174 disposed on opposite sides of the cutting surface 67. In yet another embodiment as shown in FIG. 11A, the cutting surface 267 may be a quad tooth cutting tool 274. Quad tooth cutting tools 274 are commercially available from Quadco Inc. Additional details regarding the cutting surface 67 embodiments of FIGS. 4A-6B and 12A-13B are provided below.

Figure 3B:
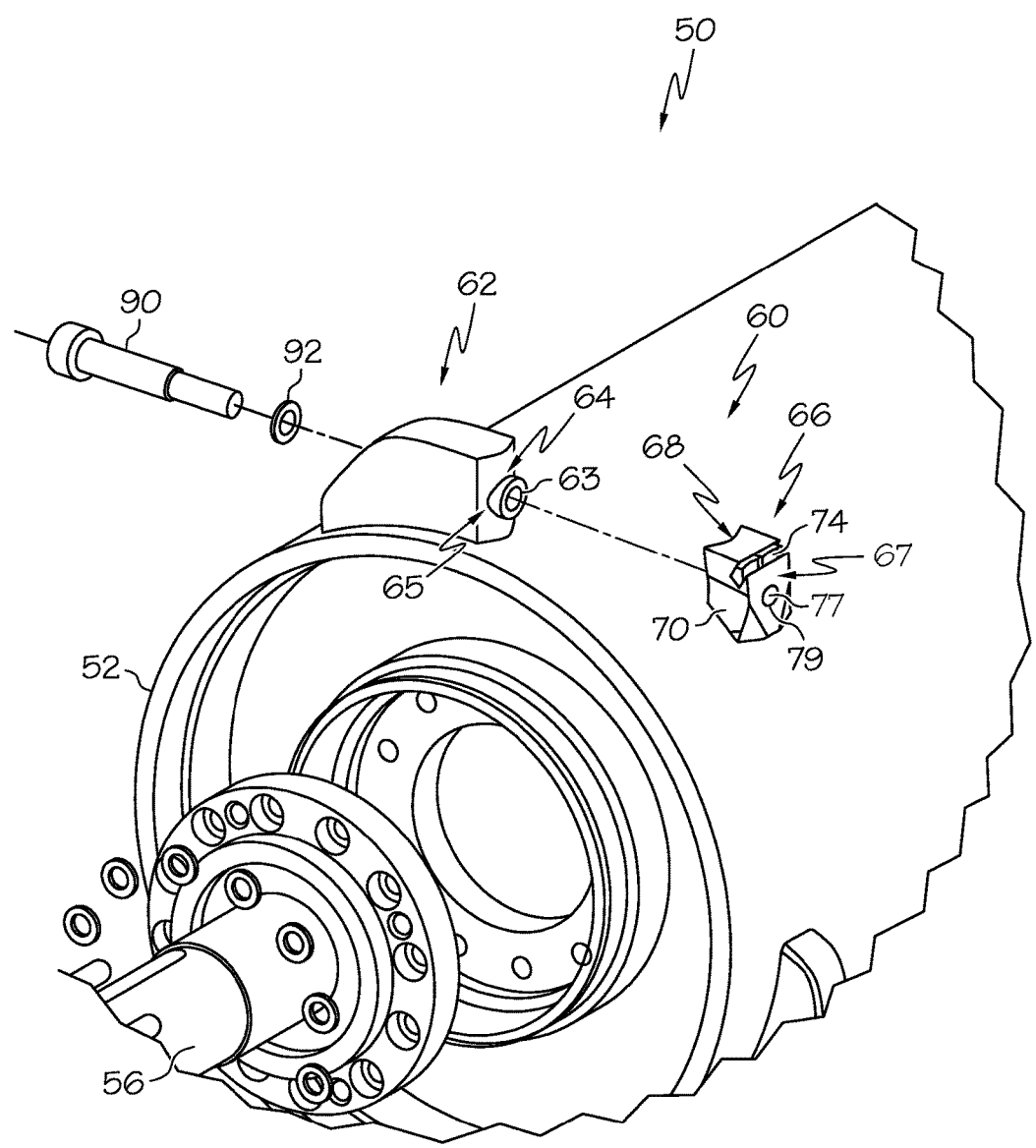
FIG. 3B is a cutaway exploded view of an exemplary rotatable tool showing the coupling arrangement of the exemplary tool assembly of FIG. 4A to the rotatable drum of FIG. 3A according to one or more embodiments of the present invention.

Referring again to the embodiment of FIGS. 3B and 4A, the interference fit of inverse mounting surfaces 64 and 68 in combination with the insertion of rounded peg 65 into rounded recess 73 yields twofold male-female coupling between the tool holder 62 and the land preparation tool 66. To further ensure that the tool holder 62 and the land preparation tool 66 are secured to each other, an additional securing mechanism may also be provided. As shown in FIG. 3B, the rotatable tool 50 may utilize one or more securing bolts 90 extending through the land preparation tool 66, specifically through the tool holder channel 63 and the channel 77 of the land preparation tool 66. For the double channel exemplary embodiment of FIG. 7A, two securing bolts (not shown) may be used to secure the tool holder 62 to the land preparation tool 66.

As stated above, the respective channels of the land preparation tool 66 and the tool holder 62 may comprise internal threads. These internal threads may be used to engage external threads (not shown) of the securing bolts 90. As shown in FIG. 3B, a locking washer 92, locking pin or other suitable mechanism may be used to ensure the securing bolt(s) 90 is firmly secure within the channels of the land preparation tool 66, and the tool holder 62. For additional details regarding the bolt securing mechanism, U.S. application Ser. No. 12/171,784 is incorporated by reference herein in its entirety.

Referring again to FIG. 3B, the inverse mounting surfaces 64 and 68 of the tool holder 62 and land preparation tool 66, respectively, yield many unique advantages to the land preparation machines 10. For example, the V-shape non-planar profiles of inverse mounting surfaces 64 and 68 provides a locking advantage by ensuring that all forces are driven to the center of the tool holder. This increased contact area, along with the V-shaped profile reduces the opportunity for the bolting system to loosen during vibration and shock loading. The vertical direction of the V-shape profile allows for symmetrical tools that can be flipped to utilize a double ended tool design. The locking advantage that the V-shape design provides greatly reduces the risk of the tool rotating or twisting the mounting joint with impacted compared to alternative designs.

Along with these advantages, the V-shaped tool profile allows for lower cost manufacturing. With the traditional mulching application, the mounting surfaces 64 and 68 of the tool holder 62 and the land preparation tool 66, respectively, require flat machined surfaces that must be perpendicular to the bolt axis. In contrast, the V-shaped profile is much more forgiving to surface finish and tolerances. The increase surface area along with the V-shape profile allows for manufacturing variations as well as the performance benefits provided by the larger supporting surface area.

Figure 9A:
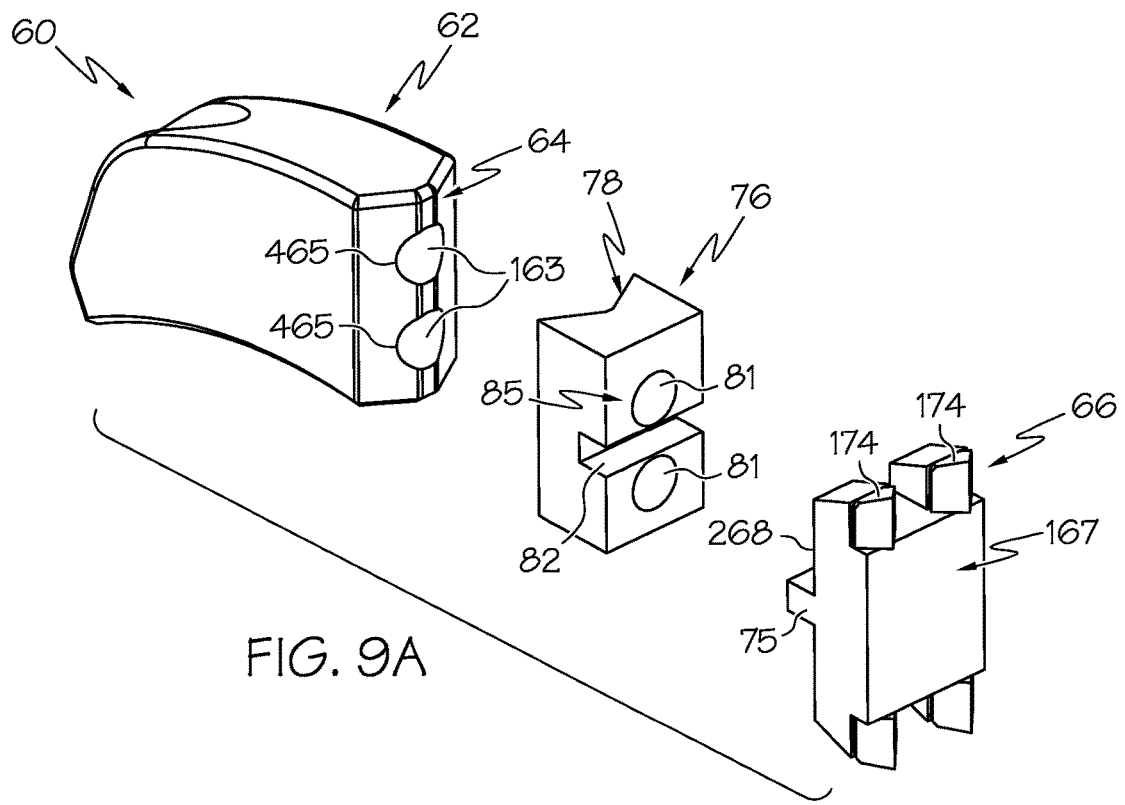
FIG. 9A is an exploded isometric view of an exemplary tool assembly comprising a tool holder, an intermediate connector, and a land preparation tool according to one or more embodiments of the present invention.
Figure 9B:
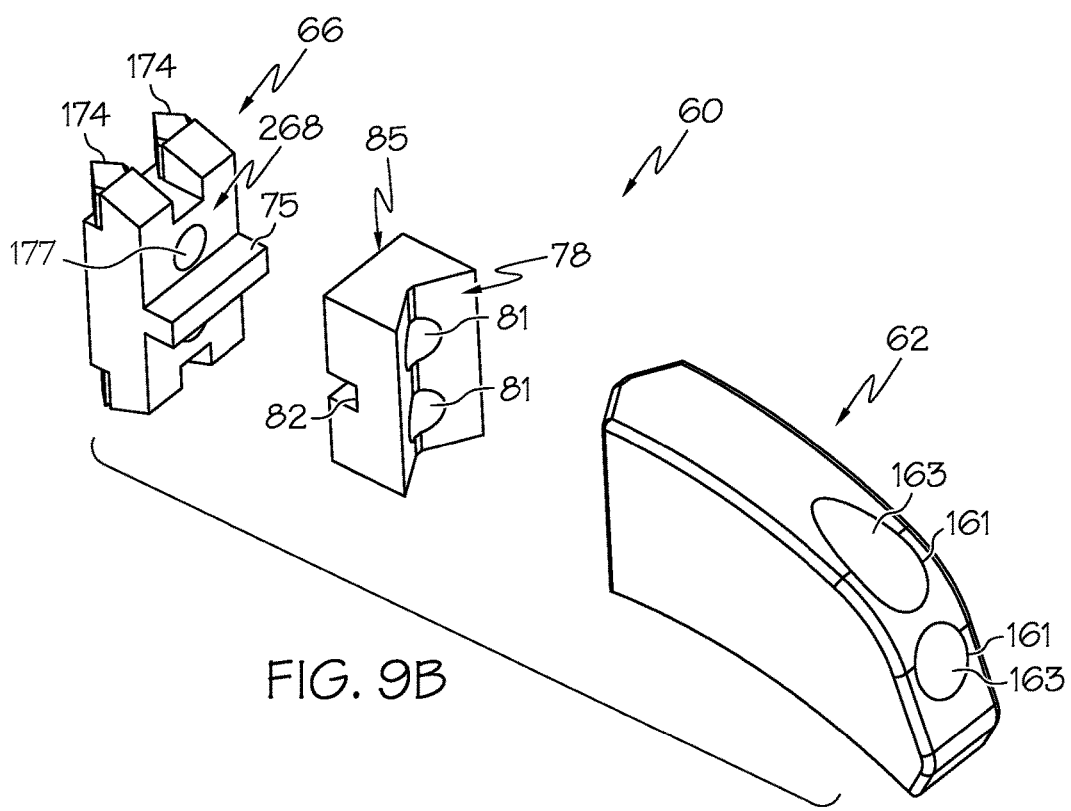
FIG. 9B is a rotated isometric view of the exemplary intermediate connector of FIG. 9A which shows the mounting surface of the exemplary land preparation tool according to one or more embodiments of the present invention.

Referring to the embodiments of FIGS. 9A and 9B, the tool assemblies 60 may also comprise intermediate connectors disposed 76 between the tool holder 62 and the land preparation tool 66 and configured to couple the tool holder 62 and the land preparation tool 66. Due to wear and tear on the tool assemblies 60 from the rotation of the drum 52 and the mulching action performed, it has been found beneficial to have an intermediate connector 76, which may be easily removed and replaced. While various materials are suitable, it is contemplated that the intermediate connector 76 may comprise a different material than the land preparation tool 66 or the tool holder 62. The intermediate connector 76 may comprise carbide, mild steel, or other materials, such as metals, and durable organic and inorganic compositions as would be familiar to one of ordinary skill in the art. The intermediate connectors 76 may also have varying shapes and dimensions. In operation, the intermediate connector 76 is operable to join the land preparation tool 66 and the tool holder 62 by press fitting, slip fitting, etc.

While optional, the intermediate connector 76 provides numerous benefits to this land preparation apparatus 14. For example, the intermediate connector 76 protects against tool holder 62 wear, while acting as a structural support for tool positioning and lateral loading. The intermediate connector 76 may also improve fastening between the tool holder 62 and land preparation tool 66. As stated above, the intermediate connector 76 has a unique design and removability that enables it to be manufactured out of materials different from the tool holder 62 or land preparation tool 66. By altering the material properties of the intermediate connector 76 material, component wear can be controlled and an increased level of tolerance may be provided with minimal cost to the system.

Referring again to FIGS. 9A and 9B, the intermediate connector 76 may comprise a tool holder interface 78, which is a surface configured to be in flush contact with the mounting surface 64 of the tool holder 62, thereby forming a friction of interference fit. The tool holder interface 78 defines a non-planar profile inverse to the non-planar profile of the tool holder mounting surface 64. Like above, the non-planar profile defines any surface, which is not a straight planar surface. Illustrations of a non-planar profile may include V-shaped, concave, or convex profiles, or combinations thereof. As shown in FIGS. 9A and 9B, the tool holder interface 78 may comprise a V-shaped concave profile, which is an inverse shape of the V-shaped convex profile of the tool holder 62, and thereby facilitates mating of the tool holder interface 78 and the tool holder mounting surface 64.

Referring again to FIGS. 9A and 9B, the intermediate connector 76 also includes a tool interface 85 disposed on a surface of the intermediate connector 76 opposite the tool holder interface 78. The tool interface 85 may be configured to contact the mounting surface 268 of the land preparation tool 66. Although FIGS. 9A and 9B depict the mounting surface 268 as a flat planar profile, it is contemplated that the mounting surface 268 could include a non-planar profile, such as the V-shaped profile or the other non-planar profiles described in detail above. It is further contemplated that the tool interface 85 and the tool mounting surface 268 may define inverse surfaces, configured to form an interference fit.

Figure 10A:
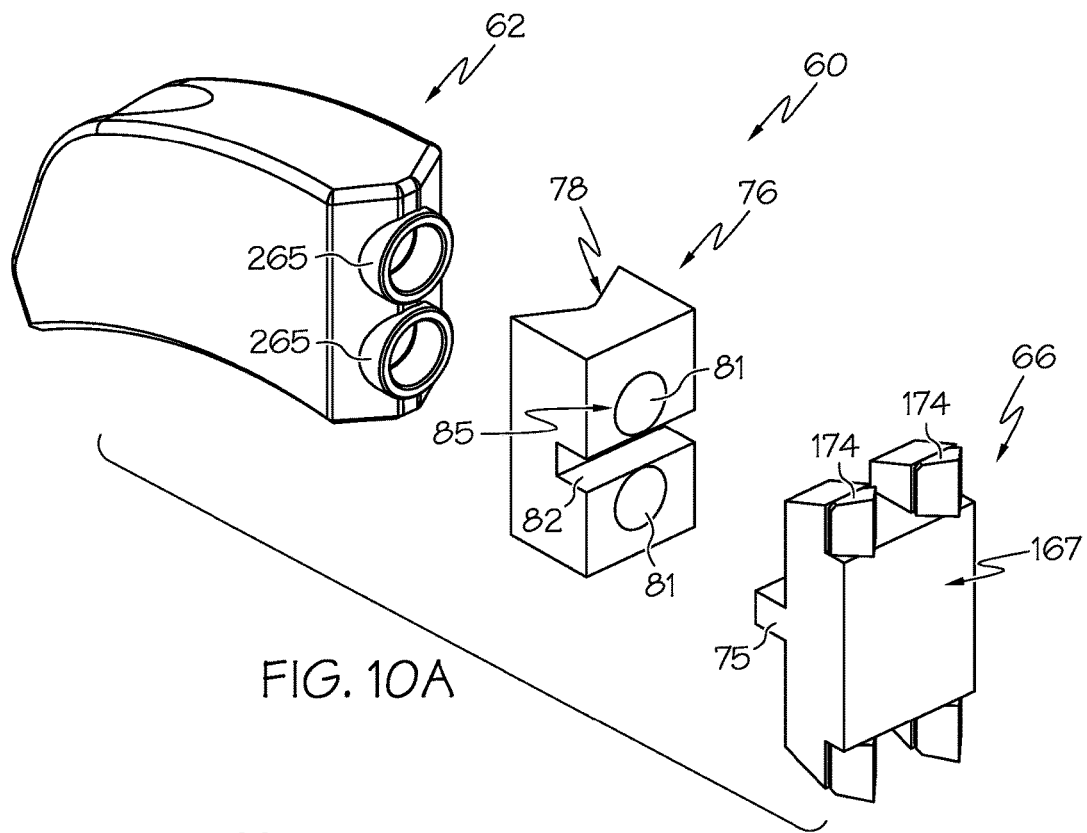
FIG. 10A is an exploded isometric view of an exemplary tool assembly comprising a tool holder, an intermediate connector, and a land preparation tool according to one or more embodiments of the present invention.
Figure 10B:
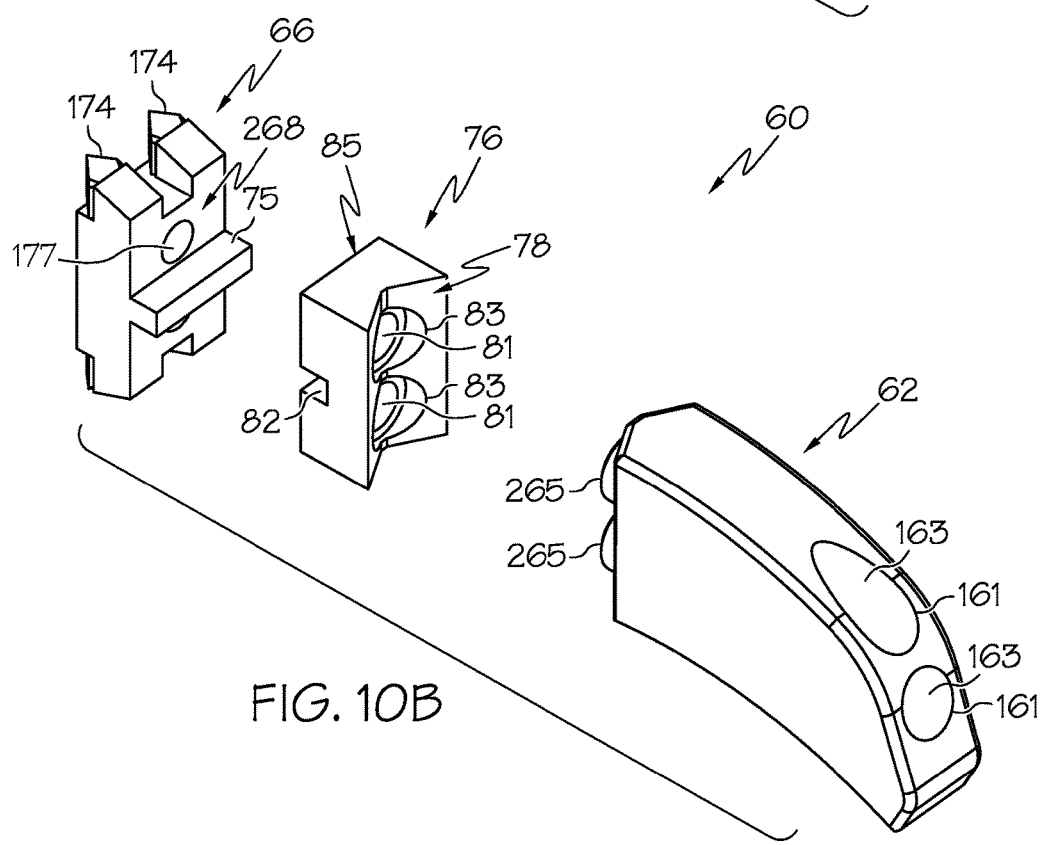
FIG. 10B is a rotated isometric view of the exemplary intermediate connector of FIG. 10A which shows the mounting surface of the exemplary land preparation tool according to one or more embodiments of the present invention.

To provide additional securing of tool assembly 60 components, additional coupling components may be utilized. Referring to FIGS. 10A and 10B, the tool holder interface 78 may comprise a coupling mechanism configured to matingly connect with a coupling mechanism (e.g. a pair of rounded pegs 265 as in FIG. 10A) of the tool holder 62. In the embodiment of FIGS. 10A and 10B, the coupling mechanism of the tool holder interface 78 may comprise two round recesses 83 operable to matingly receive the rounded pegs 265 of the tool holder 62. In the alternative embodiment of FIGS. 11A and 11B, the coupling mechanism of the tool holder interface 78 may comprise one round recess 183 operable to matingly receive a rounded peg 65 of the tool holder 62. The reverse configuration wherein the tool holder interface 78 comprises at least one round peg and the tool holder mounting surface 64 comprises at least one rounded recess is further contemplated herein.

Figure 11B:
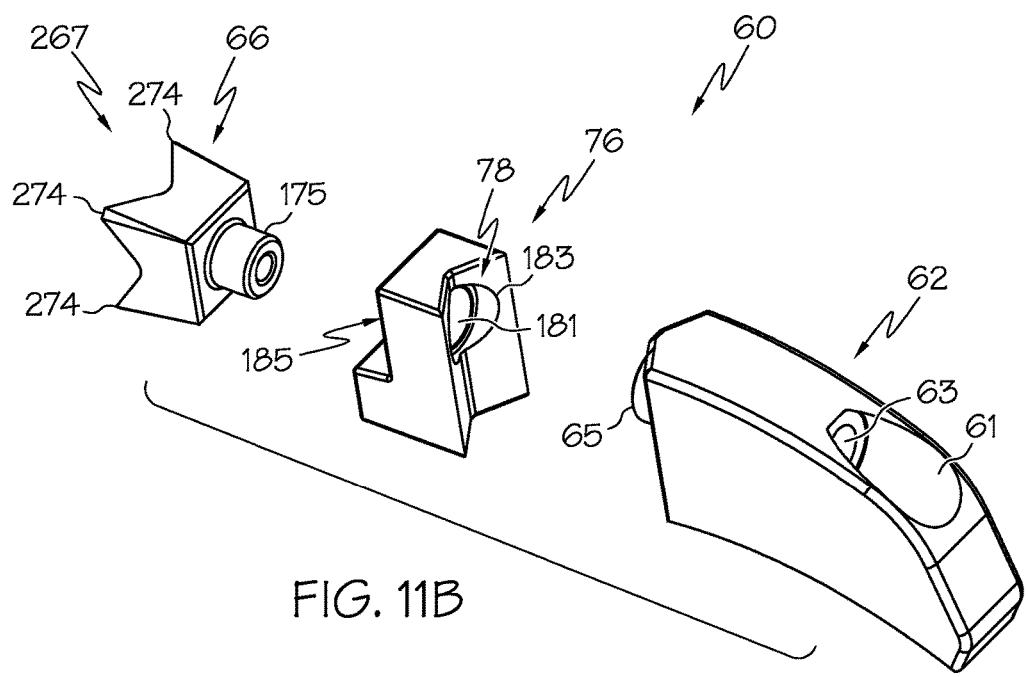
FIG. 11B is a rotated isometric view of the exemplary intermediate connector of FIG. 11A which shows the mounting surface of the exemplary land preparation tool according to one or more embodiments of the present invention.
Figure 12A:
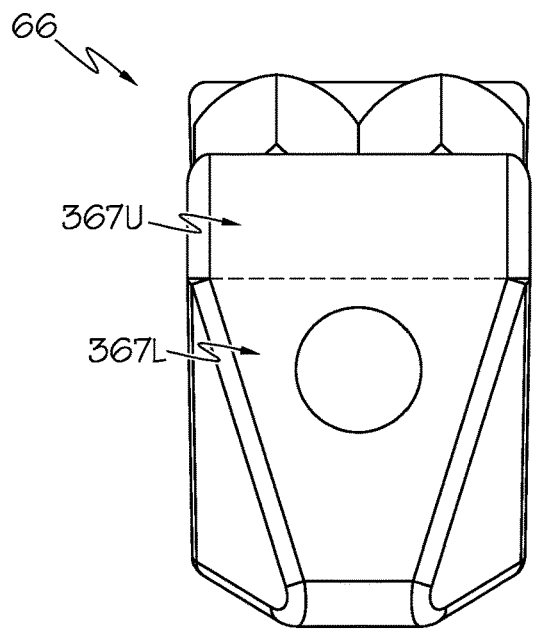
FIG. 12A is a front view of an exemplary land preparation tool comprising a cutting surface with an outwardly extending lower region according to one or more embodiments of the present invention.
Figure 12B:
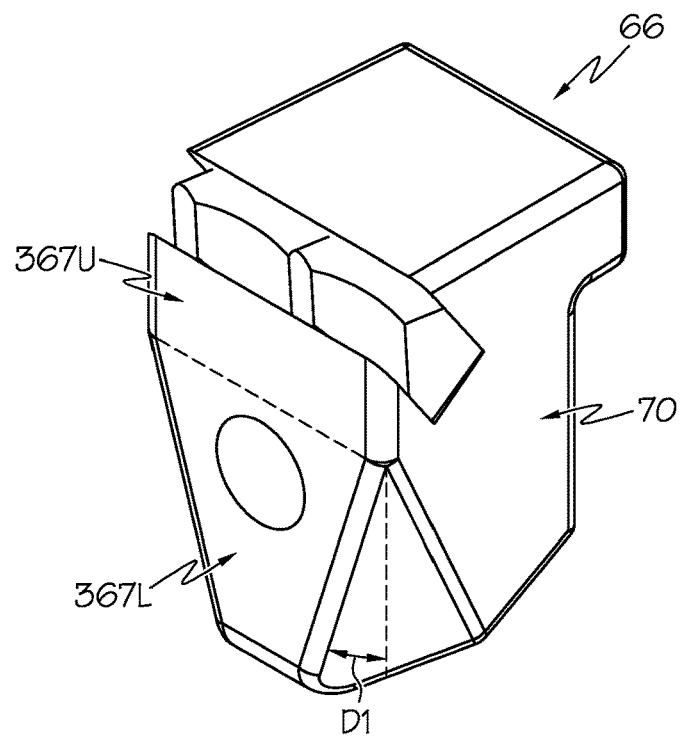
FIG. 12B is a isometric view of the exemplary land preparation tool of FIG. 12A according to one or more embodiments of the present invention.

Moreover, each tool interface 85 may comprise a coupling mechanism operable to matingly connect with a coupling mechanism of the land preparation tool 66. As shown in the embodiment of FIGS. 10A and 10B, the coupling mechanism of the tool interface 85 may comprise at least one rectangular recess 82 and the coupling mechanism of the land preparation tool 66 comprises at least one rectangular peg 75 matingly inserted into the rectangular recess 82 of the tool interface 85. In an alternative embodiment as shown in FIGS. 11A and 11B, the coupling mechanism of the tool interface 85 may comprise one round recess 182 operable to matingly receive a rounded peg 175 of the land preparation tool 66. Although the figures only depict one rectangular or round peg and one corresponding rectangular recess or rounded recess, respectively, it is contemplated that the mating arrangement may include more than one peg/recess or a combination of rectangular and round peg/recesses. Like above, the reverse configuration wherein the tool interface 85 comprises at least one rectangular peg and the tool holder comprises at least one rectangular recess is further contemplated herein.

As described above, the attachment of the tool holder 62 to the land preparation tool 66 may further include an additional securing mechanism, for example, via bolts 90 as shown in FIG. 3B. Similarly, the additional securing mechanism may also be incorporated into the tool assemblies 60 which include am intermediate connector 76, for example, the tool assembly 60 embodiments of FIGS. 9A-11B. As shown in FIG. 9A, the intermediate connector 76 may comprise at least one channel 81 extending from the tool holder interface 78 to the tool interface 85, wherein the channels 81 are configured to align with the channels 161 of the tool holder 62 and the channels 177 of the land preparation tool 66. Similar to the bolting arrangement of FIG. 3B, the bolt(s) 90 would be secured through the aligned channels of the tool holder 62, the intermediate connector 76, and the land preparation tool 66. In contrast to the double channel 81 embodiments of FIGS. 9A-10B, it is further contemplated that single channels 181 may also be used, as shown in FIGS. 11A and 11B. Further similar to the bolting arrangement of FIG. 3B, the channels 81 or 181 may include internal threads (not shown) to engage the external threads (not shown) of the bolt 90.

When assembling the land preparation apparatus 14 as shown in FIGS. 3A and 3B, the tool holder 62 is mounted to a drum 52 by a suitable mounting mechanism, for example, through a bolt, screw, or weld. To couple the land preparation tool 66 to the tool holder 62, the inverse mounting surfaces 64 and 68 contact one another, thereby forming an interference or friction fit. Additionally, the round peg 65 of the tool holder 62 may be matingly inserted into the recessed region 73 of the land preparation tool 66 to additionally secure the tool assembly 60. Moreover, bolt(s) 90 may be inserted through the channels of the tool holder 62, and land preparation tool 66 to further secure the tool assembly 60.

Alternatively, as shown in the embodiment of FIGS. 10A and 10B, the intermediate connector 76 may be utilized in the tool assembly 60 when assembling the land preparation apparatus 14. First, the tool holder interface 78 of the intermediate connector 76 and the mounting surface 64 of the tool holder 62, which define inverse non-planar surface profiles, contact one another, thereby forming an interference or friction fit. Further as shown in the embodiment of FIG. 10A, the rounded pegs 165 of the tool holder 62 may be matingly inserted into the rounded recesses 83 of the intermediate connector 76. Then, the rectangular peg 75 of the land preparation tool 66 may be matingly inserted into the recessed region 82 of the intermediate connector 76. At which point, the intermediate connector 76 resides within the land preparation tool 66 and the tool holder 62. Additionally, a bolt(s) 90 may be inserted through the channels of the tool holder 62, the intermediate connector 76, and the land preparation tool 66 to further secure the tool assembly 60.

Figure 13A:
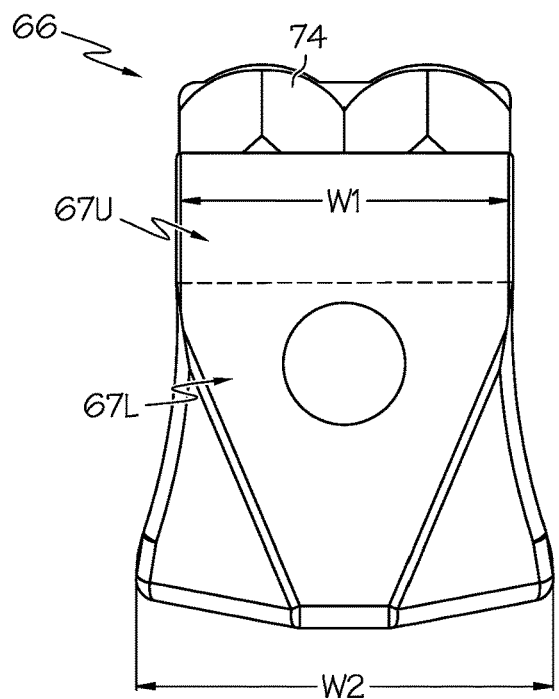
FIG. 13A is a front view of another exemplary land preparation tool comprising a cutting surface with an outwardly extending lower region and side surfaces with outwardly extending lower regions according to one or more embodiments of the present invention.
Figure 13B:
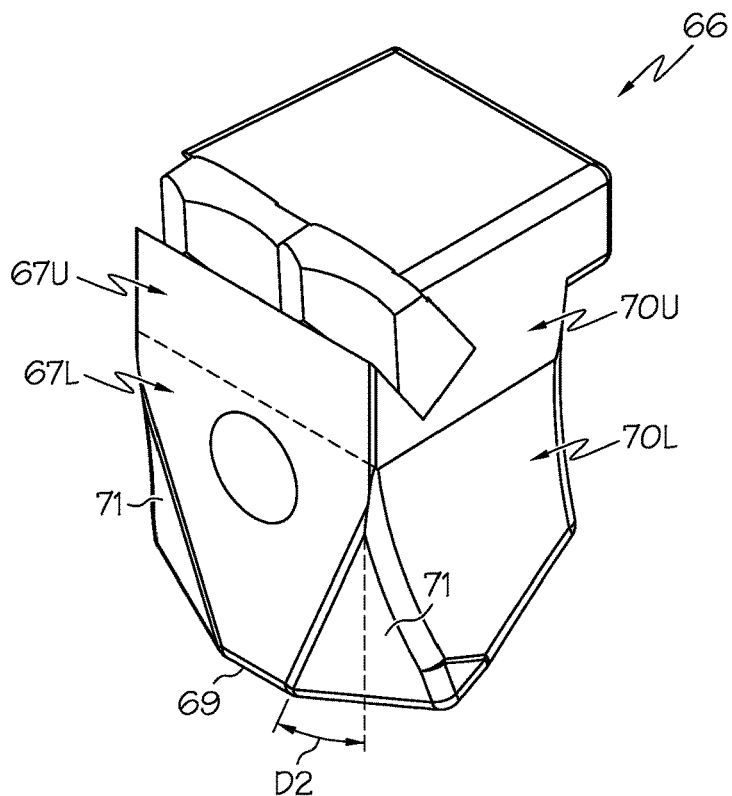
FIG. 13B is a isometric view of the exemplary land preparation tool of FIG. 13A according to one or more embodiments of the present invention.

In addition to the improved coupling of the components of the tool assembly 60, one or more embodiments of the present invention are directed to improvements in the land preparation tool 66, specifically with regard to the cutting surface 67 disposed on a surface opposite the mounting surface 68 of the land preparation tool 66. As shown in FIGS. 13A and 13B, the cutting surface 67 (as shown in FIGS. 4A-6B) may define an upper region 67U and a lower region 67L. The lower region 67L defines a non-planar profile extending outwardly from a plane defined by the upper region 67U. The non-planar lower region 67L of the cutting surface may inwardly taper from a pair of opposite edges toward a midpoint of the cutting surface, or outwardly taper from a pair of opposite edges toward a midpoint of the cutting surface. Additionally, the non-planar profile may be a V-shaped outwardly extending profile as shown in FIGS. 12A-13B, a convex profile, a concave profile, a trapezoidal profile or another suitable profile familiar to one of ordinary skill in the art. Due to this non-planar profile, the lower region 67L may define a non-planar profile extending outwardly a distance D2 from a plane defined by the upper region 67U as shown in FIGS. 13A and 13B. Moreover, the lower region 67L may extend widthwise (W2) a horizontal distance which is greater than the width (W1) of the upper region 67U. Moreover, as shown in FIGS. 13A and 13B, the land preparation tool 66 may comprise a pair of side surfaces 70 extending between the mounting surface 68 and the cutting surface 67, wherein the side surfaces 70 comprise an upper region 70U and a lower region 70L. In conjunction with the lower region 67L of the cutting surface, the lower region 70L may also extend widthwise a horizontal distance greater than the width (W1) of the upper region 67U of the cutting surface. As shown in an alternative embodiment on FIGS. 12A and 12B, the non-planar lower region 367L may define a non-planar profile extending outwardly a distance D1 from a plane defined by the upper region 367U; however, the lower region 367L does not extend widthwise a horizontal distance, which is greater than the width of the upper region 67U.

The non-planar profile of the cutting surface yields many advantages to the tool assembly 60. For example, the non-planar profile provides protection to the welds and/or the structural members of the rotor system. The welds, or fastening seats, can be achieved in a variety of mechanical or chemical fastening methods at the base of the tool holder 62. The shape of the cutting surface may protect the fastening joint, thereby providing physical protection by blocking abrasive materials from contacting the joint as well as providing ideal material flow paths to direct the abrasive material away from the joint. This protection in the form of physically blocking and the induction of material flow direction also provide improved wear characteristics of the rotor tube or center support structure and the tool holder along with the fastening joint.

In addition, the non-planar profile also provides processing advantages by directing the material flow around the tool assembly 60 to reduce the horsepower required to move the rotor through the material, and by directing the material towards the cutting tip and away from the rotor drum or center section. This material flow advantage provides the tooling system control to the depth of cut again maximizing the horsepower efficiency by limiting the size of the cut or chip.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A land preparation tool comprising:
   a tool body comprising:
      a longitudinal axis;
      a cutting surface comprising a distal end and a blade positioned at the distal end;
      a mounting surface disposed on the tool body opposite the cutting surface, the mounting surface comprising:
         an apex extending along about at least half of the mounting surface parallel to the longitudinal axis,
         a first mounting surface extending outwardly from the apex and tapering back toward the cutting surface,
         a second mounting surface opposite the first mounting surface, the second mounting surface extending outwardly from the apex and tapering back toward the cutting surface, and
         an opening disposed on the mounting surface; and
      a channel extending from the opening at least partially into the tool body.

2. The land preparation tool of claim 1, wherein the first and second mounting surfaces and apex define a non-planar profile selected from the group consisting of convex, V-shaped, and combinations thereof.

3. The land preparation tool of claim 2, wherein the non-planar profile comprises a convex non-planar profile.

4. The land preparation tool of claim 3, wherein the convex non-planar profile comprises a convex V-shaped non-planar profile.

5. The land preparation tool of claim 4, wherein the apex is rounded.

6. The land preparation tool of claim 4, wherein the channel is round.

7. The land preparation tool of claim 2, wherein the blade comprises a first blade, and further comprising:
   a second blade positioned at the distal end.

8. The land preparation tool of claim 2, wherein the blade comprises a first blade and a second blade positioned at a distal end opposite the first blade.

9. The land preparation tool of claim 1, wherein the channel extends between the opening disposed on the mounting surface to an opening disposed on the cutting surface.

10. A land preparation tool comprising:
    a tool body, the tool body comprising:
       a cutting surface comprising a distal end and a blade positioned at the distal end;
       a mounting surface disposed on the tool body opposite the cutting surface;
       a first side surface extending between the mounting surface and the cutting surface;
       a second side surface extending between the mounting surface and the cutting surface opposite the first side surface;
       an opening disposed on the mounting surface;
       a channel extending from the opening at least partially into the tool body; and
       wherein the mounting surface comprises:
          an apex extending along a portion of the mounting surface parallel to a longitudinal axis of the tool body,
          a first inclined surface tapering outwardly from the first side surface to the apex along the portion of the of the mounting surface parallel to the longitudinal axis,
          a second inclined surface, opposite the first inclined surface, tapering outwardly from the second side surface to the apex along the portion of the mounting surface parallel to the longitudinal axis, and
          the first inclined surface, apex, and second inclined surface define a V-shaped non-planar profile.

11. The land preparation tool of claim 10, wherein the V-shaped non-planar profile comprises a convex V-shaped non-planar profile.

12. The land preparation tool of claim 11, wherein the channel is round.

13. The land preparation tool of claim 12, wherein the opening is round.

14. The land preparation tool of claim 11, wherein the blade comprises a first blade, and further comprising:
a second blade positioned at the distal end.

15. The land preparation tool of claim 11, wherein the blade comprises a first blade and a second blade positioned at a distal end opposite the first blade.

16. The land preparation tool of claim 10, wherein the channel extends between the opening disposed on the mounting surface to an opening disposed on the cutting surface.

17. A land preparation tool comprising:
a tool body comprising:
a longitudinal axis;
a cutting surface comprising a distal end and a blade disposed at the distal end;
a mounting surface disposed on the tool body opposite the cutting surface, wherein the mounting surface includes a rounded opening disposed on the mounting surface, an apex that extends along at least half of the mounting surface parallel to the longitudinal axis, and first and second side mounting surfaces that each extend outwardly from the apex and taper back toward the cutting surface to form a V-shaped non-planar profile; and
a round channel extending from the rounded opening at least partially into the tool body.

18. The land preparation tool of claim 17, wherein the V-shaped non-planar profile is a convex V-shaped non-planar profile.

19. The land preparation tool of claim 17, wherein the apex is rounded.

20. The land preparation tool of claim 17, wherein the round channel extends between the rounded opening disposed on the mounting surface to an opening disposed on the cutting surface.

* * * * *